US012179142B1

(12) United States Patent
Khan et al.

(10) Patent No.: US 12,179,142 B1
(45) Date of Patent: Dec. 31, 2024

(54) MIXED MATRIX MEMBRANE WITH A COVALENT ORGANIC FRAMEWORK FOR SELECTIVE CO₂ SEPARATION

(71) Applicant: KING FAHD UNIVERSITY OF PETROLEUM AND MINERALS, Dhahran (SA)

(72) Inventors: Mohd Yusuf Khan, Dhahran (SA); Bosirul Hoque, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 0 days.

(21) Appl. No.: 18/765,778

(22) Filed: Jul. 8, 2024

(51) Int. Cl.
*B01D 53/22* (2006.01)
*B01D 53/04* (2006.01)
(Continued)

(52) U.S. Cl.
CPC ......... *B01D 53/0454* (2013.01); *B01D 53/22* (2013.01); *B01D 53/228* (2013.01); *B01J 20/226* (2013.01); *B01J 20/28033* (2013.01); *B01J 20/28061* (2013.01); *B01D 2253/202* (2013.01); *B01D 2253/304* (2013.01); *B01D 2253/306* (2013.01); *B01D 2253/308* (2013.01); *B01D 2257/504* (2013.01); *B01J 20/28007* (2013.01); *B01J 20/2808* (2013.01)

(58) Field of Classification Search
CPC .. B01D 53/0454; B01D 53/22; B01D 53/228; B01D 2253/202; B01D 2253/304; B01D 2253/306; B01D 2253/308; B01D 2257/504; B01J 20/226; B01J 20/28033; B01J 20/28061; B01J 20/28007; B01J 20/2808

USPC ............................ 95/43, 45, 51; 96/4, 12–14
See application file for complete search history.

(56) References Cited

U.S. PATENT DOCUMENTS

| | | | | |
|---|---|---|---|---|
| 2018/0056246 A1* | 3/2018 | Nair | ................ | B01D 69/14111 |
| 2018/0065105 A1* | 3/2018 | Song | ................ | B01D 69/1214 |
| 2021/0331122 A1* | 10/2021 | Li-Oakey | ............. | B01D 61/027 |

FOREIGN PATENT DOCUMENTS

| | | |
|---|---|---|
| CN | 113856493 A | 12/2021 |
| CN | 113275041 B | 6/2022 |

(Continued)

OTHER PUBLICATIONS

Hogue et al. ; Tailored design of CO2-selective mixed-matrix membranes using nitrile-functionalized COFs as 2D nanofillers ; Journal of Environmental Chemical Engineering, vol. 32, Issue 3; Apr. 2024 ; 12 pages.*

(Continued)

*Primary Examiner* — Frank M Lawrence, Jr.
(74) *Attorney, Agent, or Firm* — Oblon, McClelland, Maier & Neustadt, L.L.P.

(57) ABSTRACT

A method of separating a gas mixture, including contacting the gas mixture with a membrane and passing a portion of the gas mixture through the membrane. The portion of the gas mixture that passes through the membrane includes carbon dioxide. The membrane includes a poly(ether-block-amide) (PEBAX) and a covalent organic framework (COF). The COF is an optionally substituted COF-316 and the COF is dispersed in a matrix of the PEBAX to form the membrane. The membrane includes 0.1-5 wt. % of the COF relative to a total weight of the membrane.

19 Claims, 14 Drawing Sheets

(51) Int. Cl.
  *B01J 20/22*      (2006.01)
  *B01J 20/28*      (2006.01)

(56) References Cited

FOREIGN PATENT DOCUMENTS

| CN | 114849776 A | 8/2022 |
| CN | 115814771 A | 3/2023 |

OTHER PUBLICATIONS

Hoque et al. ; Tailored design of CO2-selective mixed-matrix membranes using nitrile-functionalized COFs as 2D nanofillers ; Journal of Environmental Chemical Engineering, vol. 32, Issue 3 ; Jun. 2024 ; 5 Pages.

Embaye et al. ; Poly(ether-block-amide) Copolymer Membranes in CO2 Separation Applications ; Enery Fuels, 35 ; 2021 ; 18 Pages.

\* cited by examiner

MIXED MATRIX MEMBRANE WITH A COVALENT ORGANIC FRAMEWORK FOR SELECTIVE $CO_2$ SEPARATION

STATEMENT OF PRIOR DISCLOSURE BY INVENTOR

Aspects of the present disclosure are described in B. Hoque, M. Y. Khan, A. Hanif, M. Abdelnaby, A. Helal, A. Khan, M. Usman, Q. A. Drmosh. "Tailored design of CO2-selective mixed-matrix membranes using nitrile-functionalized COFs as 2D nanofillers"; Journal of Environmental Chemical Engineering; 2024; 12; 3; 112695, incorporated herein by reference in its entirety.

STATEMENT OF ACKNOWLEDGEMENT

Support provided by King Fahd University of Petroleum and Minerals (KFUPM) is gratefully acknowledged.

BACKGROUND

Technical Field

The present disclosure is directed to a membrane and, more particularly directed to a method of separating a gas mixture using a mixed matrix membrane with a covalent organic framework.

Description of Related Art

The "background" description provided herein is to present the context of the disclosure generally. Work of the presently named inventors, to the extent it is described in this background section, as well as aspects of the description that may not otherwise qualify as prior art at the time of filing, are neither expressly nor impliedly admitted as prior art against the present invention.

Carbon dioxide ($CO_2$) emissions from human activities, such as the burning of fossil fuels for energy supply, have a negative impact on the environment. The amount of $CO_2$ in the air can be decreased by selectively separating it from the ambient air and flue gas. Membrane-based separation processes are regarded as a practical, environmentally friendly, and cost-effective technology for industrial use in various industries, including petrochemical, culinary, and pharmaceuticals. Polymeric membranes have been reported for their effectiveness in $CO_2$ separation process over the last two decades. Numerous advantages of the membrane-based separation technique include low operating costs, ease of scaling and building, mechanical stability, and environmental friendliness. However, a trade-off known as the Robeson upper bound exists between gas permeability and selectivity in gas separation through polymeric membranes. This constrains the performance of polymeric membranes from being improved to reach the necessary standard for efficient $CO_2$ separation. To improve performance a mixed matrix membranes (MMMs) approach can be used.

In the mixed matrix approach, two phases are mixed to obtain a homogeneous and compatible mixture. Generally, a polymer serves as a continuous phase while fillers act as a disperse phase. However, a lack of compatibility between the two phases often fosters defects and voids in MMMs. A large inventory of nanofillers has been reported such as metal-organic frameworks (MOFs), silica, carbon monolith, zeolitic imidazolate frameworks (ZIFs), Zeolites, carbon molecular sieves, and graphene oxide (GO). However, 2D nanomaterials offer additional advantages, such as atomic-level thickness, the presence of small intrinsic pores, and interlayer channels. Tuning of intrinsic pores can modify the physiochemical properties and facilitate the gas transport properties of the MMMs. Additionally, the molecular sieving function of 2D nanomaterials can have an impact on applications involving gas separation. Recently, a novel class of porous 2D materials known as covalent organic frameworks (COFs) has gained much attention. However, these benefits come with difficulties that must be overcome to fabricate MMMs without defects.

The interfacial compatibility between the organic polymer and inorganic filler is one of the main obstacles to introducing porous fillers as the disperse phase in polymers. Furthermore, incompatibilities between guest fillers and polymers can result in polymer chain blockage, denying gas molecules access to the filler's pores, or gas molecules can permeate through the polymer, bypassing the porous filler. Hence, the selection of filler materials based on their physical and chemical nature is one of the determining factors in developing effective MMMs.

Therefore, there remains a need for improved membrane compatibility, performance, and selectivity. One object of the present disclosure is to provide a MMM including a polymer and a COF for efficient and selective $CO_2$ separation.

SUMMARY

In an exemplary embodiment, a method of separating a gas mixture is described. The method includes contacting the gas mixture with a membrane and passing a portion of the gas mixture through the membrane. The portion of the gas mixture that passes through the membrane includes carbon dioxide. The membrane includes a poly(ether-block-amide) (PEBAX) and a covalent organic framework (COF). The COF is an optionally substituted COF-316 and the COF is dispersed in a matrix of the PEBAX to form the membrane. The membrane includes 0.1-5 wt. % of the COF relative to a total weight of the membrane.

In some embodiments, particles of the COF are in a form of nanosheets having a length of 1-5 μm, a width of 1-5 μm, and a thickness of 10-50 nm.

In some embodiments, the nanosheets align parallel to a surface of the membrane in the matrix of the PEBAX.

In some embodiments, the COF has a Brunauer-Emmett-Teller (BET) surface area of 250-350 $m^2g^{-1}$.

In some embodiments, the COF is crystalline.

In some embodiments, the COF has a pore width of 12-15 Å.

In some embodiments, the COF is stable up to 400° C.

In some embodiments, the COF has the following structure:

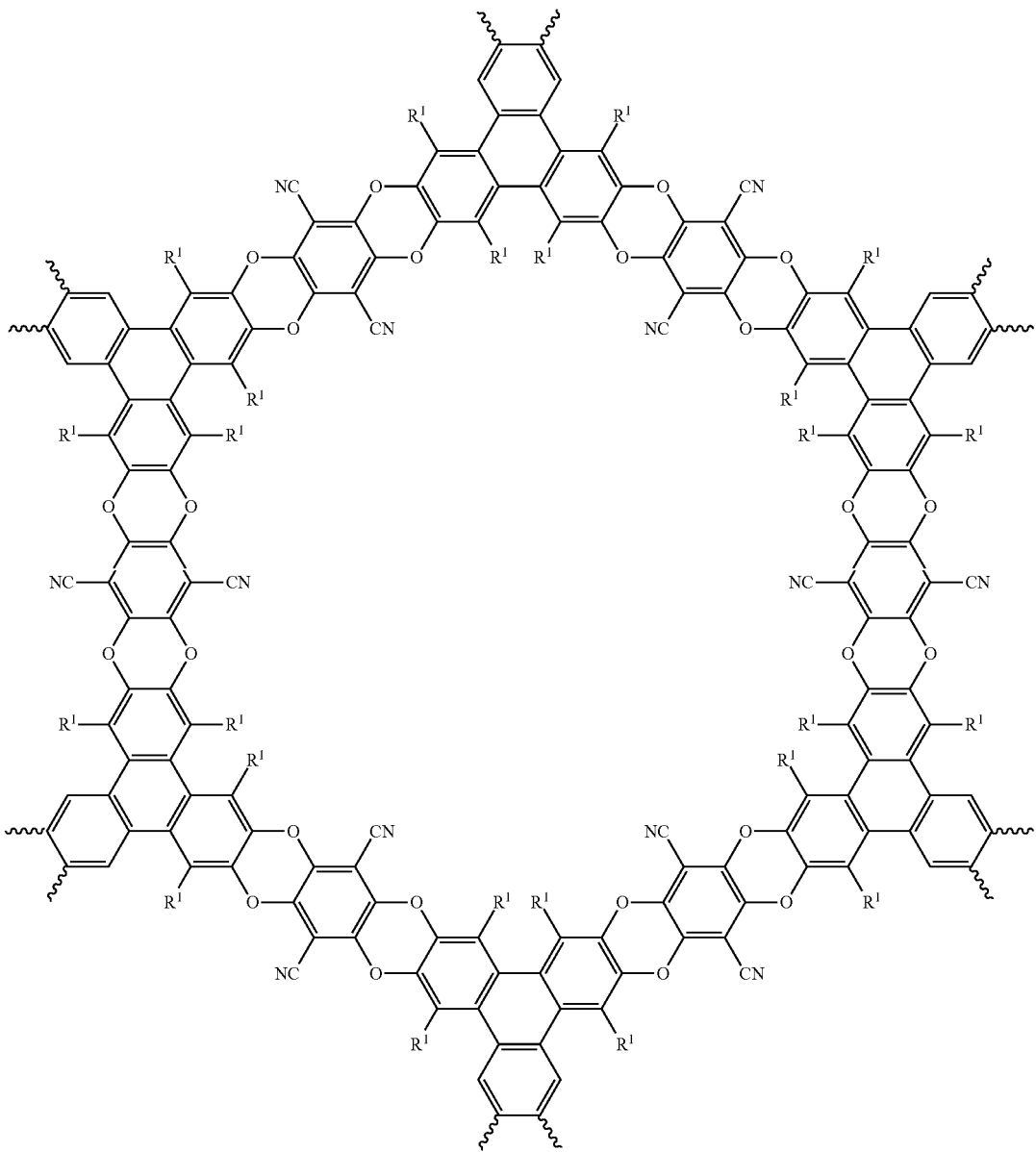

In some embodiments, $R^1$ is selected from the group consisting of a hydrogen, a hydroxyl, a carboxyl, an amine, a thiol, a nitrile, a cyanate, an isocyanate, and an amide, and the squiggly lines represent bonding to additional units of the COF.

In some embodiments, the COF is COF-316.

In some embodiments, the COF does not form aggregates in the membrane and is homogeneously dispersed.

In some embodiments, the PEBAX is PEBAX-1657.

In some embodiments, the method includes passing the gas mixture at a pressure of 1-5 bar.

In some embodiments, the PEBAX and the COF do not interact through covalent bonds.

In some embodiments, the membrane has a thickness of 20-200 micrometers (μm).

In some embodiments, the membrane has a density of 1.00 to 1.15 $g/cm^3$.

In some embodiments, the membrane has a free fractional volume of 14-22%.

In some embodiments, the gas mixture further includes at least one selected from the group consisting of nitrogen, oxygen, and argon.

In some embodiments, the membrane has a higher permeability for carbon dioxide than for other gases.

In some embodiments, the membrane has a $CO_2$ permeability of 2-5 times larger than a membrane under the same conditions but without the COF.

In some embodiments, the membrane includes 0.5 wt. % of the COF relative to a total weight of the membrane and has a $CO_2/N_2$ selectivity of 2-5 times larger than a membrane under the same conditions but without the COF.

The foregoing general description of the illustrative present disclosure and the following detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1A:
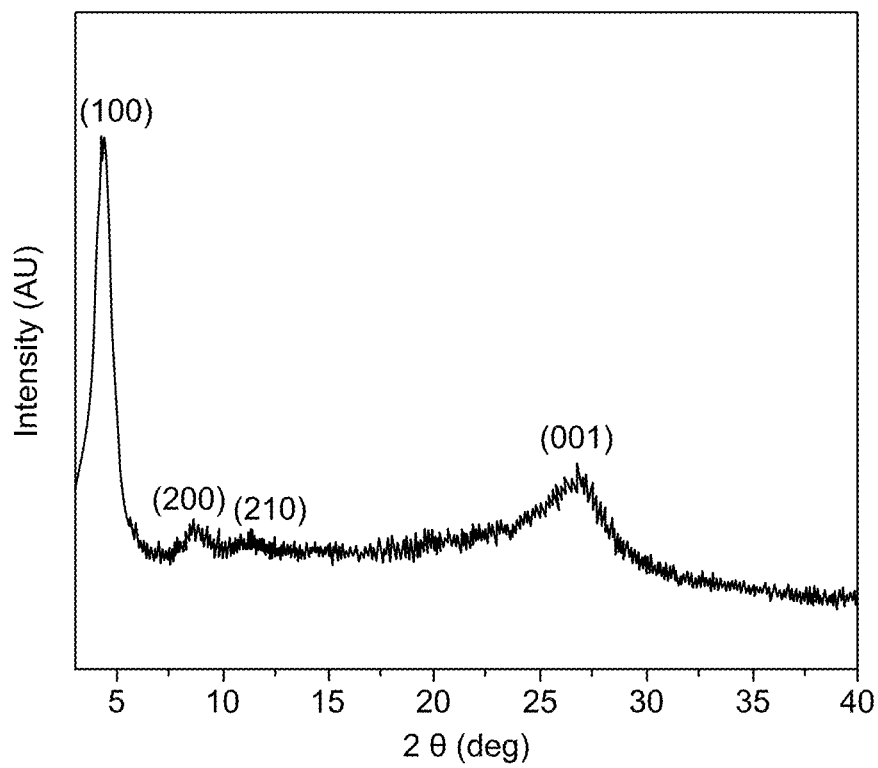
FIG. 1A shows a powder X-ray diffraction (PXRD) pattern of a covalent organic framework (COF), COF-316, according to certain embodiments.

When describing the present disclosure, the terms used are to be construed in accordance with the following definitions, unless a context dictates otherwise.

Where a numerical limit or range is stated herein, the endpoints are included. Also, all values and subranges within a numerical limit or range are specifically included as if explicitly written out.

Embodiments of the present invention will now be described more fully hereinafter with reference to the accompanying drawings wherever applicable, in that some, but not all embodiments of the disclosure are shown.

In the drawings, like reference numerals designate identical or corresponding parts throughout the several views. Further, as used herein, the words "a," "an" and the like generally carry a meaning of "one or more," unless stated otherwise.

Furthermore, the terms "approximately", "approximate", "about," and similar terms generally refer to ranges that include the identified value within a margin of 20%, 10%, or preferably 5%, and any values therebetween.

The use of the terms "include," "includes", "including," "have," "has," or "having" should be generally understood as open-ended and non-limiting unless specifically stated otherwise.

As used herein, "nanoparticles" are particles having a particle size of 1 nm to 500 nm within the scope of the present invention.

As used herein, "particle size" and "pore size" may be thought of as the lengths or longest dimensions of a particle and of a pore opening, respectively.

As used herein, the term "room temperature" refers to a temperature in a range of "25° C.±3° C. in the present disclosure.

The present disclosure is intended to include all hydration states of a given compound or formula unless otherwise noted or when heating a material.

As used herein, the term "polar" refers to compounds or functional groups having at least one bond which does not share electrons equally, meaning the negative charge from the electrons is not evenly distributed in the molecule.

As used herein, the term "non-polar" refers to compounds or functional groups having bonds which share electrons equally.

As used herein, the term "substituted" refers to at least one hydrogen atom that is replaced with a non-hydrogen group, provided that normal valencies are maintained and that the substitution results in a stable compound. When a substituent is noted as "optionally substituted", the substituent(s) are selected from alkyl, halo (e.g., chloro, bromo, iodo, fluoro), hydroxyl, alkoxy, oxo, alkanoyl, aryloxy, alkanoyloxy, amino (—$NH_2$), alkylamino (—NHalkyl), cycloalkylamino (—NHcycloalkyl), arylamino (—NHaryl), arylalkylamino (—NHarylalkyl), disubstituted amino (e.g., in which the two amino substituents are selected from alkyl, aryl or arylalkyl, including substituted variants thereof, with specific mention being made to dimethylamino), alkanoylamino, aroylamino, arylalkanoylamino, thiol, alkylthio, arylthio, arylalkylthio, alkylthiono, arylthiono, arylalkylthiono, alkylsulfonyl, arylsulfonyl, arylalkylsulfonyl, sulfonamide (e.g., —$SO_2NH_2$), substituted sulfonamide (e.g., —$SO_2$NHalkyl, —$SO_2$NHaryl, —$SO_2$NHarylalkyl, or cases where there are two substituents on one nitrogen selected from alkyl, aryl, or alkylalkyl), nitro, cyano, carboxy, unsubstituted amide (i.e. —$CONH_2$), substituted amide (e.g., —CONHalkyl, —CONHaryl, —CONHarylalkyl or cases where there are two substituents on one nitrogen selected from alkyl, aryl, or alkylalkyl), alkoxycarbonyl, aryl, guanidine, heterocyclyl (e.g., pyridyl, furyl, morpholinyl, pyrrolidinyl, piperazinyl, indolyl, imidazolyl, thienyl, thiazolyl, pyrrolidyl, pyrimidyl, piperidinyl, homopiperazinyl), and mixtures thereof. The substituents may themselves be optionally substituted, and may be either unprotected, or protected as necessary, as known to those skilled in the art, for example, as taught in Greene, et al., "Protective Groups in Organic Synthesis", John Wiley and Sons, Second Edition, 1991, hereby incorporated by reference in its entirety.

Aspects of the present disclosure are directed to a membrane for gas separation. The membrane includes two components: a covalent organic framework (COF) filler and poly(ether-b-amide) (PEBAX). The COF, in conjunction with PEBAX-1657, was used to create mixed-matrix membranes (MMMs) and evaluated for $CO_2$ separation. The membrane of the present disclosure demonstrates increased $CO_2$ permeability and $CO_2/N_2$ selectivity.

A membrane is described. The membrane includes two components, a COF filler and polyether block amide (PEBA). PEBA is a thermoplastic elastomer (TPE), known under the tradename of PEBAX® (Arkema) and VESTAMID® E (Evonik Industries). It is a block copolymer obtained by polycondensation of a carboxylic acid polyamide (PA) with an alcohol termination polyether (PE). PEBAX is available commercially in various grades, such as but not limited to PEBAX® 1657, 1074, 5513, 2533, and 3000. The general structure of PEBAX is shown below in Formula (I).

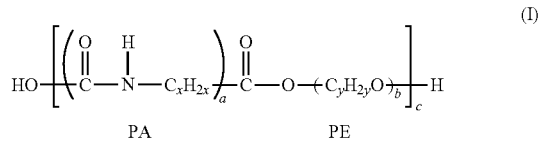

(I)

In Formula (I), a+b=1, c is 1 to 100, x is 1 to 20, and y is 1 to 20. In some embodiments, a is from 0 to 0.99, preferably 0.1, 0.2, 0.3, 0.4, 0.5, 0.6, 0.7, 0.8, 0.9, or 0.95, provided that a+b=1. In some embodiments, b is from 0 to 0.99, preferably 0.1, 0.2, 0.3, 0.4, 0.5, 0.6, 0.7, 0.8, 0.9, or 0.95, provided that a+b=1. In some embodiments, c is from 1 to 100, preferably 5, 10, 15, 20, 25, 30, 35, 40, 45, 50, 55, 60, 65, 70, 75, 80, 85, 90, or 95. In some embodiments, x is from 1 to 20, preferably 2, 3, 4, 5, 6, 7, 8, 9, 10, 11, 12, 13, 14, 15, 16, 17, 18, or 19. In some embodiments, y is from 1 to 20, preferably 2, 3, 4, 5, 6, 7, 8, 9, 10, 11, 12, 13, 14, 15, 16, 17, 18, or 19. In a preferred embodiment, the PEBAX is PEBAX-1657, where a=0.4, b=0.6, x=5, and y=2.

Covalent organic frameworks (COFs) are a class of porous polymers that form two- or three-dimensional structures through reactions between organic precursors resulting in strong, covalent bonds to afford porous, stable, and crystalline materials. COFs are built with secondary building units (SBUs), or precursors.

Generally, COFs are built by joining molecules containing light elements, i.e., H, B, C, N, and O. The topology of the synthesized 2D or 3D framework is decided by the size, structural orientation, and connectivity of the precursor molecules. Several organic linkages, like B—O, C=N, C—N, B—N, N—N, C—O, and C=C, have been effectively used to stitch molecules together via covalent bond formation in the production of COFs.

In a preferred embodiment, the COF is a 1,4 dioxin linked COF and may be optionally substituted. An example of the 1,4 dioxin linkage is shown below in Formula (IV), where the squiggly lines represent linkages to additional units of the COF. Formulas (II) and (III) depict SBUs, which may be varied based on the desired structure and substitution of the COF.

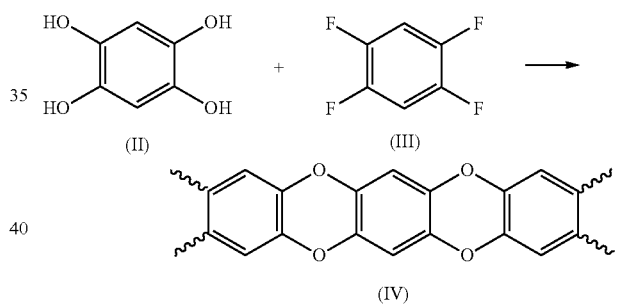

In some embodiments, the Formulas (II) and (III) are substituted to vary the properties of the COF, as shown in Formulas (IIa) and (IIIa) as shown below.

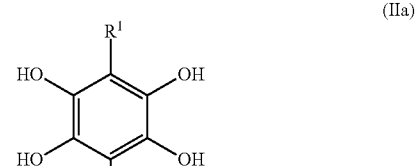

(IIa)

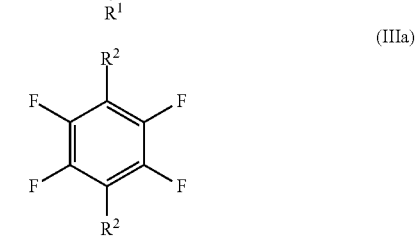

(IIIa)

In some embodiments, $R^1$ and $R^2$ are the same or different and are selected from the group consisting of a hydrogen, a hydroxyl, a carboxyl, an amine, a thiol, a nitrile, a cyanate, an isocyanate, and an amide. In a preferred embodiment, at least one of $R^1$ and $R^2$ are a polar group.

In some embodiments, the COF is an optionally substituted COF-316, where $R^2$ is a nitrile. In some embodiments, the optionally substituted COF-316 has the following structure (V), where the squiggly lines represent bonding to additional units of the COF. In some embodiments, the COF is COF-316 where $R^1$ is hydrogen.

(V)

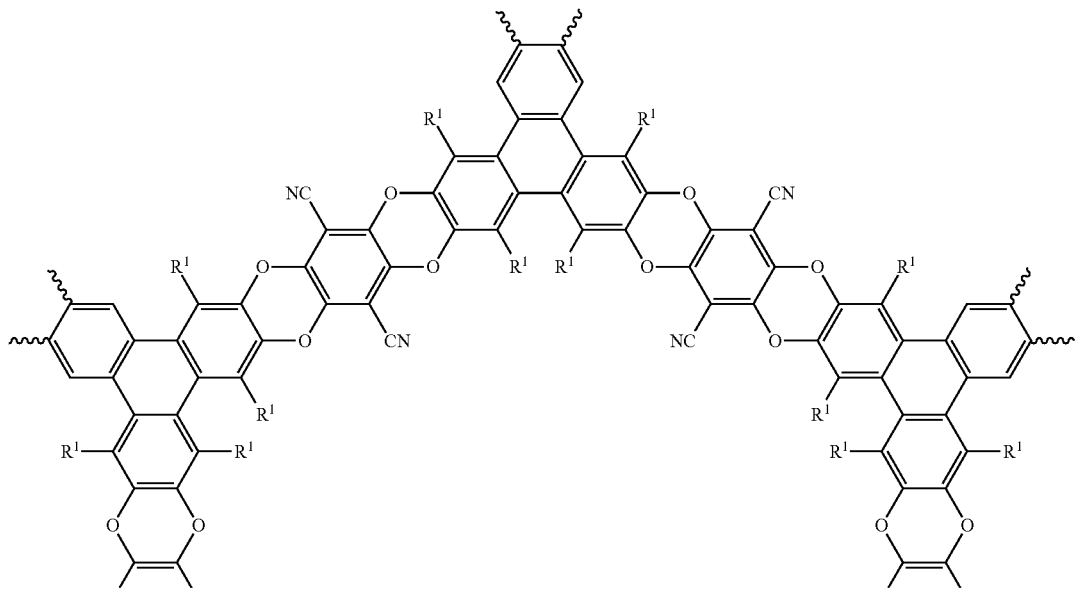

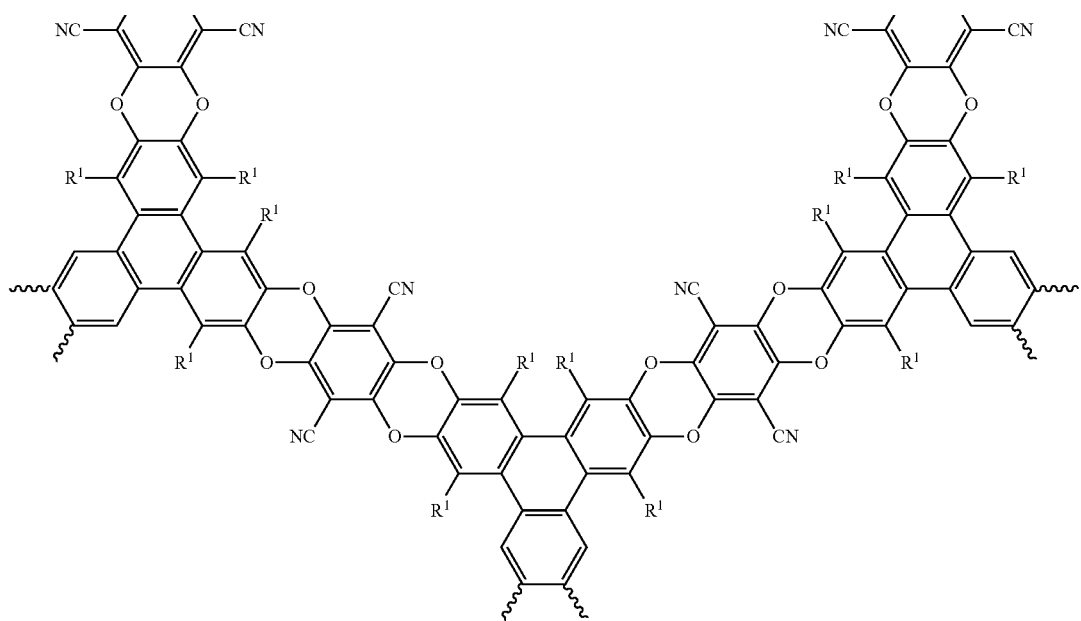

In some embodiments, the COF is crystalline, and in the crystalline COF the structures of Formula (V) are preferably stacked directly on top of one another. This forms vertical pore channels through the stacks of the COF units along with extended horizontal units of the COF forming a honeycomb structure, thereby producing a crystalline three dimensional structure. In an alternative embodiment, the COF units are stacked in a staggered, inclined, or in a serrated structure.

In some embodiments, particles of the COF are in the form of nanosheets. In alternate embodiments, the particles of the COF may have different morphologies, such as nanowires, nanorods, nanocrystals, nanorectangles, nanotriangles, nanopentagons, nanohexagons, nanoprisms, nanodisks, nanocubes, nanoribbons, nanoblocks, nanobeads, nanotoroids, nanodiscs, nanobarrels, nanogranules, nanowhiskers, nanoflakes, nanofoils, nanopowders, nanoboxes, nanostars, tetrapods, nanobelts, nano-urchins, nanoflowers, etc. and mixtures thereof. The particles of the COF are in the form of nanosheets having a length of 1-5 µm, preferably 2-4 µm, and preferably 3 µm, a width of 1-5 µm, preferably 2-4 µm, and preferably 3 µm, and a thickness of 10-50 nm, preferably 15-45 nm, preferably 20-40 nm, and preferably 25-35 nm.

In some embodiments, the COF has a BET surface area of 250-350 $m^2g^{-1}$, preferably 260-340 $m^2g^{-1}$, preferably 270-330 $m^2g^{-1}$, preferably 280-320 $m^2g^{-1}$, and preferably 290-310 $m^2g^{-1}$. In a preferred embodiment, the COF has a BET surface area of 320 $m^2g^{-1}$. In some embodiments, the COF has a Langmuir surface area of 400-500 $m^2g^{-1}$, preferably 410-490 $m^2g^{-1}$, preferably 420-480 $m^2g^{-1}$, preferably 430-470 $m^2g^{-1}$, and preferably 440-460 $m^2g^{-1}$. In a preferred embodiment, the COF has a Langmuir surface area of 470 $m^2g^{-1}$.

In some embodiments, the COF has a pore width of 12-15 Å, preferably 12.5-14.5 Å and preferably 13-14 Å. In a preferred embodiment, the COF has a pore width of 12.7 Å. The pore width can be adjusted based on the SBUs and substitutions. In some embodiments, the COF is stable up to 400° C., preferably up to 395° C., preferably up to 390° C., preferably up to 385° C., and preferably up to 380° C. In a preferred embodiment, the COF is stable up to 400° C.

The COF is dispersed in a matrix of PEBAX to form the membrane. In some embodiments, the COF is homogeneously dispersed in the matrix of the PEBAX to form the membrane. Within the matrix, the COF is preferably not aggregated. In some embodiments, the membrane includes 0.1-5 wt. %, preferably 0.5-4.5 wt. %, preferably 1.0-4.0 wt. %, preferably 1.5-3.5 wt. %, and preferably 2.0-3.0 wt. % of the COF relative to a total weight of the membrane. In an embodiment, the membrane includes 0.5 wt. % of the COF relative to the total weight of the membrane.

In some embodiments, the nanosheets align parallel to the surface of the membrane in the matrix of the PEBAX. This orientation allows for the formation of channels of the COF pores in the membrane through which the carbon dioxide may pass. The nature of the interaction between PEBAX and the COF is preferably non-covalent; in other words, the COF and PEBAX do not interact through covalent bonds, but rather, London dispersion forces, hydrogen bonds, and/or Van der Waals forces.

In some embodiments, the membrane has a thickness of 20-200 µm, preferably 30-190 µm, preferably 40-180 µm, preferably 50-170 µm, preferably 60-160 µm, preferably 70-150 µm, preferably 80-140 µm, preferably 90-130 µm, preferably 100-120 µm. In some embodiments, the membrane has a density of 1.00-1.15 $g/cm^3$, preferably 1.01-1.14 $g/cm^3$, preferably 1.02-1.13 $g/cm^3$, preferably 1.03-1.12 $g/cm^3$, preferably 1.04-1.11 $g/cm^3$, preferably 1.05-1.10 $g/cm^3$, preferably 1.06-1.09 $g/cm^3$, and preferably 1.07-1.08 $g/cm^3$. In some embodiments, the membrane has a free fractional volume of 14-22%, preferably 15-21%, preferably 16-20%, and preferably 17-19%.

The membrane of the present disclosure may be used for gas separation. Accordingly, a method of separating a gas mixture using the membrane is described. The method includes contacting the gas mixture with a membrane and passing a portion of the gas mixture through the membrane. The portion of the gas mixture that passes through the membrane includes carbon dioxide. In some embodiments, the gas mixture further includes other gases such as nitrogen, oxygen, carbon monoxide, and argon. In a preferred embodiment, the gas mixture includes nitrogen ($N_2$) and ($CO_2$). The gas mixture is passed at a pressure of 1-5 bar, preferably 2-4 bar, and preferably 3 bar. The membrane has a $CO_2/N_2$ selectivity of 2-5 times and preferably 3-4 times larger than a membrane under the same conditions but without the COF. In some embodiments, the membrane has a higher permeability for $CO_2$ than for other gases. In some embodiments, the membrane has a $CO_2$ permeability of 2-5 times, preferably 3-4 times larger than a membrane under the same conditions but without the COF.

While not wishing to be bound to a single theory, it is thought that the addition of the COF filler in the PEBAX matrix increases the free fractional volume by disrupting the chain packing of the PEBAX polymer, which increases $CO_2$ permeability through the pore channels of the COF. In addition, the high selectivity of the membrane for $CO_2$ is associated with the polar PE groups of the PEBAX and COF having polar CN functionalities within the pore, thereby preferably interacting with polar $CO_2$ and not with a non-polar gas such as $N_2$. Further, unexpectedly at low weight percentages (0.25 and 0.5), the COF filler is evenly dispersed in the matrix and has higher $CO_2$ permeability than at higher weight percentages when particles of the filler are aggregated.

In some embodiments, the membrane includes instead of the COF or in addition to the COF another filled selected from the group consisting of a graphene-based material, alumina, a carbon nanotube, an activated carbon, a metal organic framework (MOF), and a zeolitic imidazolate framework (ZIF).

A metal organic framework (MOF) is a coordination network with organic ligands containing potential voids. A coordination network is a coordination compound extending, through repeating coordination entities, in one dimension, but with cross-links between two or more individual chains, loops, or spiro-links, or a coordination compound extending through repeating coordination entities in two or three dimensions; and finally a coordination polymer is a coordination compound with repeating coordination entities extending in one, two, or three dimensions. A coordination entity is an ion or neutral molecule that is composed of a central atom, usually that of a metal, to which is attached a surrounding array of atoms or groups of atoms, each of which is called ligands. More succinctly, a metal organic framework is characterized by metal ions or clusters coordinated to organic ligands to form one-, two-, or three-dimensional structures. Typically, a MOF exhibits a regular void or pore structure. The nature of the void or pore structure, including properties or structural factors such as the geometry about the metal ions or clusters, the arrangement of the linkages between metal ions or clusters, and the number, identity, and spatial arrangement of voids or pores. These properties may be described as the structure of the repeat units and the nature of the arrangement of the repeat units. The specific structure of the MOF, which may include the void or pore structure is typically referred to as the MOF topology.

The metal-organic framework comprises a metal ion which is an ion of at least one metal selected from the group consisting of a transition metal (e.g. Sc, Ti, V, Cr, Mn, Fe, Co, Ni, Cu, Y, Zr, Nb, Mo, Tc, Ru, Rh, Pd, Ag, Hf, Ta, W, Re, Os, Ir, Pt, Au, Rf, Db, Sg, Bh, Hs, Mt, Ds, Rg, and Cn), a post-transition metal (e.g. Al, In, Ga, Sn, Bi, Pb, Tl, Zn, Cd, and Hg), and an alkaline earth metal (e.g. Be, Mg, Ca, Sr, Ba, and Ra). Further, these metal ions may be of any oxidation state $M^{+1}$, $M^{+2}$, $M^{+3}$, etc. In one or more embodiments, the metal ion is an ion of at least one metal selected from the group consisting of Zn, Cu, Fe, Ni, Co, Mn, Cr, Cd, Mg, Ca, and Zr.

In the formation of a metal organic framework, the organic ligands must meet certain requirements to form coordination bonds, primarily being multi-dentate, having at least two donor atoms (i.e., N—, and/or O—) and being neutral or anionic. The structure of the metal organic framework is also affected by the shape, length, and functional groups present in the organic linker. In certain embodiments, the metal organic framework of the present disclosure comprises anionic ligands as organic ligands. In one or more embodiments, the organic ligands may have at least two nitrogen donor atoms. For example, the organic ligands may be imidazolate-based, imidazole-derived or ligands similar to an imidazole including, but not limited to, optionally substituted imidazoles, optionally substituted benzimidazoles, optionally substituted imidazolines, optionally substituted pyrazoles, optionally substituted thiazoles, and optionally substituted triazoles. In a preferred embodiment, the metal organic framework of the present disclosure in any of its embodiments comprises 2-methylimidazole and 5-methylbenzimidazole as the organic ligands. 2-Methylimidazole and 5-methylbenzimidazole organic ligands have free nitrogen atoms that may each form a coordinative bond to the metal ions (e.g. Zn(II)) to produce a coordination network.

Metal organic frameworks comprising such imidazole or benzimidazole ligands are typically referred to as zeolitic imidazolate frameworks (ZIFs). In some embodiments, the metal organic framework is a zeolitic imidazolate framework. Examples of suitable metal organic frameworks include, but are not limited to isoreticular metal organic framework-3 (IRMOF-3), MOF-69A, MOF-69B, MOF-69C, MOF-70, MOF-71, MOF-73, MOF-74, MOF-75, MOF-76, MOF-77, MOF-78, MOF-79, MOF-80, DMOF-1-NH2, UMCM-1-NH2, MOF-69-80, ZIF-1, ZIF-2, ZIF-3, ZIF-4, ZIF-5, ZIF-6, ZIF-7, ZIF-8, ZIF-9, ZIF-10, ZIF-11, ZIF-12, ZIF-14, ZIF-20, ZIF-21, ZIF-22, ZIF-23, ZIF-25, ZIF-60, ZIF-61, ZIF-62, ZIF-63, ZIF-64, ZIF-65, ZIF-66, ZIF-67, ZIF-68, ZIF-69, ZIF-70, ZIF-71, ZIF-72, ZIF-73, ZIF-74, ZIF-75, ZIF-76, ZIF-77, ZIF-78, ZIF-79, ZIF-80, ZIF-81, ZIF-82, ZIF-90, ZIF-91, ZIF-92, ZIF-93, ZIF-94, ZIF-96, ZIF-97, ZIF-100, ZIF-108, ZIF-303, ZIF-360, ZIF-365, ZIF-376, ZIF-386, ZIF-408, ZIF-410, ZIF-412, ZIF-413, ZIF-414, ZIF-486, ZIF-516, ZIF-586, ZIF-615, and ZIF-725.

In general, the carbon nanomaterial may be any suitable carbon nanomaterial known to one of ordinary skill in the art. Examples of carbon nanomaterials include carbon nanotubes, carbon nanobuds, carbon nanoscrolls, carbon dots, activated carbon, carbon black, graphene, graphene oxide, reduced graphene oxide, and nanodiamonds. In some embodiments, the carbon nanomaterial is at least one selected from the group consisting of graphene, graphene oxide, reduced graphene oxide, carbon nanotubes, carbon dots, and activated carbon.

In some embodiments, the carbon nanomaterial is carbon nanotubes. The carbon nanotubes may, in general, be any suitable carbon nanotubes known to one of ordinary skill in the art. Carbon nanotubes may be classified by structural properties such as the number of walls or the geometric configuration of the atoms that make up the nanotube. Classified by their number of walls, the carbon nanotubes can be single-walled carbon nanotubes (SWCNT) which have only one layer of carbon atoms arranged into a tube, or multi-walled carbon nanotubes (MWCNT), which have more than one single-layer tube of carbon atoms arranged so as to be nested, one tube inside another, each tube sharing a common orientation. Closely related to MWNTs are carbon nanoscrolls. Carbon nanoscrolls are structures similar in shape to a MWCNT, but made of a single layer of carbon atoms that has been rolled onto itself to form a multi-layered tube with a free outer edge on the exterior of the nanoscroll and a free inner edge on the interior of the scroll and open ends. The end-on view of a carbon nanoscroll has a spiral-like shape. For the purposes of this disclosure, carbon nanoscrolls are considered a type of MWCNT. Classified by the geometric configuration of the atoms that make up the nanotube, carbon nanotubes can be described by a pair of integer indices n and m. The indices n and m denote the number of unit vectors along two directions in the honeycomb crystal lattice of a single layer of carbon atoms. If m=0, the nanotubes are called zigzag type nanotubes. If n=m, the nanotubes are called armchair type nanotubes. Otherwise, they are called chiral type nanotubes. In some embodiments, the carbon nanotubes are metallic. In other embodiments, the carbon nanotubes are semiconducting. In some embodiments, the carbon nanotubes are SWCNTs. In other embodiments, the carbon nanotubes are MWCNTs. In some embodiments, the carbon nanotubes are carbon nanoscrolls. In some embodiments, the carbon nanotubes are zigzag type nanotubes. In alternative embodiments, the carbon nanotubes are armchair type nanotubes. In other embodiments, the carbon nanotubes are chiral type nanotubes.

In some embodiments, the carbon nanomaterial is graphene. In some embodiments, the carbon nanomaterial is graphene nanosheets. Graphene nanosheets may consist of stacks of graphene sheets, the stacks having an average thickness and a diameter. In some embodiments, the stacks comprise 1 to 60 sheets of graphene, preferably 2 to 55 sheets of graphene, preferably 3 to 50 sheets of graphene.

In some embodiments, the graphene is in the form of graphene particles. The graphene particles may have a spherical shape, or may be shaped like blocks, flakes, ribbons, discs, granules, platelets, angular chunks, rectangular prisms, or some other shape. In some embodiments, the graphene particles may be substantially spherical, meaning that the distance from the graphene particle centroid (center of mass) to anywhere on the graphene outer surface varies by less than 30%, preferably by less than 20%, more preferably by less than 10% of the average distance. In some embodiments, the graphene particles may be in the form of agglomerates.

In some embodiments, the graphene is pristine graphene. Pristine graphene refers to graphene that has not been oxidized or otherwise functionalized. Pristine graphene may be obtained by methods such as exfoliation, chemical vapor deposition synthesis, opening of carbon nanotubes, unrolling of carbon nanoscrolls, and the like. In alternative embodiments, the graphene is functionalized graphene. Functionalized graphene is distinguished from pristine graphene by the presence of functional groups on the surface or edge of the graphene that contain elements other than carbon and hydrogen. In other alternative embodiments, the graphene is graphene oxide. Graphene oxide refers to graphene that has various oxygen-containing functionalities that are not present in pristine graphene. Examples of such oxygen-containing functionalities include epoxides, carbonyl, carboxyl, and hydroxyl functional groups. Graphene oxide is sometimes considered to be a type of functionalized graphene.

In other alternative embodiments, the graphene is reduced graphene oxide. Reduced graphene oxide (rGO) refers to graphene oxide that has been chemically reduced. It is distinct from graphene oxide in it contains substantially fewer oxygen-containing functionalities compared to graphene oxide, and it is distinct from pristine graphene by the presence of oxygen-containing functionalities and structural defects in the carbon network. Reduced graphene oxide is sometimes considered to be a type of functionalized graphene. In preferred embodiments, the carbon nanomaterial is reduced graphene oxide. The reduced graphene oxide may exist as nanosheets, particles having a spherical shape, or may be shaped like blocks, flakes, ribbons, discs, granules, platelets, angular chunks, rectangular prisms, or some other shape as described above, agglomerates as described above, or any other shape known to one of ordinary skill in the art.

In some embodiments, the carbon nanomaterial is activated carbon. Activated carbon refers to a form of porous carbon having a semi-crystalline, semi-graphitic structure and a large surface area. Activated carbon may be in the form of particles or particulate aggregates having micropores and/or mesopores. Activated carbon typically has a surface area of approximately 500 to 5000 $m^2/g$. The activated carbon particles may have a spherical shape, or may be shaped like sheets, blocks, flakes, ribbons, discs, granules, platelets, angular chunks, rectangular prisms, or some other shape. In some embodiments, the activated carbon particles may be substantially spherical, meaning that the distance from the activated carbon particle centroid (center of mass) to anywhere on the activated carbon particle outer surface varies by less than 30%, preferably by less than 20%, more preferably by less than 10% of the average distance.

In some embodiments, the carbon nanomaterial is carbon black. Carbon black refers to having a semi-crystalline, semi-graphitic structure and a large surface area. Carbon black may be distinguished from activated carbon by a comparatively lower surface area, typically 15 to 500 $m^2/g$ for carbon black. Additionally, carbon black may lack the requisite micropores and mesopores of activated carbon. The carbon black particles may have a spherical shape, or may be shaped like sheets, blocks, flakes, ribbons, discs, granules, platelets, angular chunks, rectangular prisms, or some other shape.

As used herein, the term "zeolitic," "zeolite," "zeolitic materials," and similar terms generally refer to a material having the crystalline structure or three-dimensional framework of, but not necessarily the elemental composition of, a zeolite. Zeolites are porous silicate or aluminosilicate minerals that occur in nature. Elementary building units of zeolites are $SiO_4$ (and if appropriate, $AlO_4$) tetrahedra. Adjacent tetrahedra are linked at their corners via a common oxygen atom, which results in an inorganic macromolecule with a three-dimensional framework (frequently referred to as the zeolite framework). The three-dimensional framework of a zeolite also comprises channels, channel intersections, and/or cages having dimensions in the range of 0.1-10 nm, preferably 0.2-5 nm, more preferably 0.2-2 nm. Water molecules may be present inside these channels, channel intersections, and/or cages. Zeolites which are devoid of aluminum may be referred to as "all-silica zeolites" or "aluminum-free zeolites". Some zeolites which are substantially free of, but not devoid of, aluminum are referred to as "high-silica zeolites". Sometimes, the term "zeolite" is used to refer exclusively to aluminosilicate materials, excluding aluminum-free zeolites or all-silica zeolites.

In some embodiments, the zeolitic material has a three-dimensional framework that is at least one zeolite framework selected from the group consisting of a 4-membered ring zeolite framework, a 6-membered ring zeolite framework, a 10-membered ring zeolite framework, and a 12-membered ring zeolite framework. The zeolite may have a natrolite framework (e.g. gonnardite, natrolite, mesolite, paranatrolite, scolecite, and tetranatrolite), edingtonite framework (e.g. edingtonite and kalborsite), thomsonite framework, analcime framework (e.g. analcime, leucite, pollucite, and wairakite), phillipsite framework (e.g. harmotome), gismondine framework (e.g. amicite, gismondine, garronite, and gobbinsite), chabazite framework (e.g. chabazite-series, herschelite, willhendersonite, and SSZ-13), faujasite framework (e.g. faujasite-series, Linde type X, and Linde type Y), mordenite framework (e.g. maricopaite and mordenite), heulandite framework (e.g. clinoptilolite and heulandite-series), stilbite framework (e.g. barrerite, stellerite, and stilbite-series), brewsterite framework, or cowlesite framework. In some embodiments, the porous silicate and/or aluminosilicate matrix is a zeolitic material having a zeolite framework selected from the group consisting of ZSM-5, ZSM-8, ZSM-11, ZSM-12, ZSM-18, ZSM-23, ZSM-35 and ZSM-39.

EXAMPLES

The following examples demonstrate a method of separating a gas mixture. The examples are provided solely for illustration and are not to be construed as limitations of the present disclosure, as many variations thereof are possible without departing from the spirit and scope of the present disclosure.

Example 1: Materials 2,3,6,7,10,11-Hexahydroxytriphenylene (HHTP; 95%) was purchased from TCI chemicals. Tetrafluorophthalonitrile (TFPN; 98%) and ethanol (99.5 wt. %, anhydrous) were procured from Sigma-Aldrich. Triethylamine (99.91%) was purchased from Sigma Aldrich. N, N-dimethylformamide (DMF; 99.8%), 1,4-dioxane (99.8%), tetrahydrofuran (THF; 99.8%), acetone (99.8%), were purchased from Fischer Scientific. Commercial poly(ether-block-amide) abbreviated as PEBAX-1657, was procured from Arkema (France). Deionized water (DI water) purified by reverse osmosis and ultrapure water system (>18.3 M (2 cm) was used in all the experiments. The high purity nitrogen (99.999%) and carbon dioxide (99.9%) were supplied by Abdullah Hashim Company, Dammam, KSA. All the chemicals were used as received without any further purification.

Example 2: Synthesis of Covalent Organic Framework (COF)-316

COF-316 (1,4 dioxin linked COF) was synthesized in the Schlenk Tube apparatus. HHTP (0.0928 mmol), TFPN (0.138 mmol), triethylamine (0.560 mmol), and 1,4-dioxane (2.0 mL) were added in a clean and dry Schlenk tube (ST) with an inner empty volume of 10 ml. After placing all the components, the Schlenk tube's openings were closed tightly by a cap, and then the mixture was sonicated for 5 min, followed by being flash frozen at 77 K in a liquid $N_2$ bath. The whole system was evacuated by two freeze-pump-thaw cycles before placing it inside an oven for 3 days at 120° C. After 72 h, a brown precipitate formed the bottom of the tube. The ST was allowed to cool to room temperature, and then the powder was collected by filtration in DMF, followed by washing in DMF for 3 days. Once all unreacted materials were washed away, the product was immersed in water for another 3 days, during which the solvent was decanted and replaced 3 times per day. The wet solid was further thoroughly washed with THF and acetone for 24 hours. Finally, the product was heated at 40° C. for 6 h and 160° C. for 15 h to yield a guest-free final product.

Example 3: Fabrication of Pure and Mixed Matrix PEBAX-1657 Membranes

Before membrane manufacturing, PEBAX-1657 beads and as-synthesized purified COF-316 (1,4 dioxin linked COF) were kept under vacuum for an overnight period at 80° C. to remove any remaining moisture and traces of adsorbed molecules. All membranes (including mixed matrix and neat PEBAX-1657) were prepared using a solution casting technique. All the membranes had the same proportion of PEBAX-1657 and COF-316 to solvent (ethanol+water), which was 5 wt. % of PEBAX-1657 or PEBAX-1657+COF-316 and 95 wt. % of solvent. A calculated amount of COF-316 filler (0.25-1.0 wt. %) was sonicated for 15 minutes to ensure proper dispersion before being added to a mixture of water and ethanol (70:30 wt. %) for each membrane production to create the 5 wt. % solution. The calculated amount of PEBAX-1657 beads was thereafter added to the aforementioned dispersion. To get a homogeneous combination, the solution mixture was refluxed at 80° C. for 4 h. The liquid was placed into a circular (2") plastic mold and allowed to slowly evaporate the solvent at room temperature for 24 hours before being heated for another 24 hours at 40° C. The membranes were removed from the plastic mold after 48 h and put inside an oven at 70° C. for 24 h under vacuum. The PEBAX-1657 membrane alone without the COF-316 is referred to herein as a pure membrane, and MMMs that have 0.25 to 1.0 wt. % of COF-316 added to them are referred to as 0.25 MMMs to 1.0 MMMs. By using an IP65 digital micrometer from Mitutoyo, the thickness of the pure and MMMs was determined. The following equation (1) is used to calculate the weight (%) of COF-316 in MMMs.

$$\text{Filler loading (weight \%)} = \frac{\text{Weight of Filler}}{\text{Total Weight (Polymer + Filler)}} \times 100 \quad (1)$$

Example 4: Characterization Techniques

Powder X-ray diffraction (PXRD) was conducted to collect the crystallographic information of the COF-316, and MMMs were recorded using a Rigaku MiniFlex diffractometer, which was equipped with Cu—Kα radiation (2=1.540 Å). The data were acquired over the 2θ range of 3° and 40° at a 2° per minute scanning rate. Field Emission Scanning Electron Microscope (FESEM, Tescan Lyra-3 Dual Beam instrument) equipped with an Energy Dispersion Spectrometer (EDX, Oxford Instruments) was used to determine the morphology of the synthesized COF-316 and cross-sectional details of the fabricated membranes. Attenuated total reflectance Fourier transform infrared spectrophotometry (ATR-FTIR) was performed for COF-316, HTTP, TFPN, and fabricated COF-316/PEBAX-1657 MMMs on Nicolet 6700 spectrometer. COF-316 were subjected to thermo-gravimetric analysis (TGA) using a Mettler Toledo device. The samples were heated in air at a rate of 10° C./min from 25° C. to 800° C. $N_2$ adsorption isotherm of the COF-316 was recorded using Quantachrome Autosorb iQ (ASIQ000-4, USA). The Brunauer-Emmet-Teller (BET) method was applied to evaluate the surface area and pore size of the COF-316 from the adsorption isotherm. The analytical balance kit 33360 from Mettler Toledo is equipped with a density measurement kit used for the measurement of the densities (ρ) of the samples in accordance with the Archimedes principle (Eq. 2). The membranes (pure and MMMs) were weighed at room temperature in high-purity cyclohexane and air.

$$P_m = \left(\frac{w_{air}}{w_{air} - w_s}\right)\rho_s \quad (2)$$

Where m, s, and W stand for membrane, solvent (cyclohexane), and weight of the membrane, respectively.

Example 5: Gas Permeance Analysis

A constant volume/variable pressure system was utilized to assess the performance of the neat and MMMs for the transportation of pure gases ($N_2$ and $CO_2$) at room temperature. Before assessing the gas permeance, the membranes were placed in a vacuum oven at 70° C. for about 1-2 days. A circular piece of membrane with an active area of ~4.8 $cm^2$ was installed in a homemade permeation unit to conduct the permeation experiment. After installation of the membrane, both feed and receiving sides were evacuated to approximately 35 mTorr until no further pressure change was noticed. Upstream pressure was set at 800, 2250, and 3750 Torr and downstream pressure of the $CO_2$ or $N_2$ was monitored by the pressure transducer equipped with the system. The membrane was activated again by releasing pressure to its starting level before starting the next experiment. To assure repeatability and to omit the influence of leftover gas from the previous run, each gas permeance experiment was conducted at least three times. The pure gas's permeability (P) was determined using the below mathematical approach shown in Equation (3):

$$P = 10^{10}\left[\frac{dp_d}{dt_{ss}} - \frac{dp_d}{dt_{LR}}\right]\frac{V_d^1}{(p_1 - p_2)\text{ART}} \quad (3)$$

where P=permeability coefficient in barrier ($10^{-10}$ $cm^3$ (STP) cm/$cm^2$·s·cm·Hg)), $d_{pd}/d_{tss}$ denotes the downstream pressure rise (cmHg/s) at the steady rate, $d_{pd}/dt_{LR}$ represents the downstream leak rate (cmHg/s), $V_d$ depicts the downstream volume ($cm^3$), l is the thickness of membranes (cm), $p_1$ is upstream pressure (cmHg), A is the area of membrane ($cm^2$), $p_1$ and $p_2$ are upstream and downstream pressures respectively. R=universal gas constant [0.278 $cm^3$cmHg/($cm^3$(STP) K)], and T=absolute temperature in Kelvin (K). Selective separation of gas pair $CO_2/N_2$ was evaluated by calculating the separation factor or ideal selectivity (a) following the (Eq.4): where $\alpha A/B$ represents the selectivity of gas A relative to gas B, while PA and PB represent the permeability of gas A and B respectively.

$$\alpha_{AB} = \frac{P_A}{P_B} \quad (4)$$

Example 6: Membrane Characterization

FIG. 1A depicts the powder-XRD of COF-316. The obtained COF-316 is crystalline and has a strong peak at the lower 2θ (4.3°) of the XRD diagram. The presence of the diffraction peak at a lower angle in FIG. 1A confirms the development of the crystalline domain in the material. Other lower-intensity diffraction peaks [210, 201] at 8.8° and 11.5°, and a broad peak [001] 27.1° completely tally with the reported XRD peaks and subsequently, confirm the successful synthesis of crystalline COF-316.

Figure 1B:
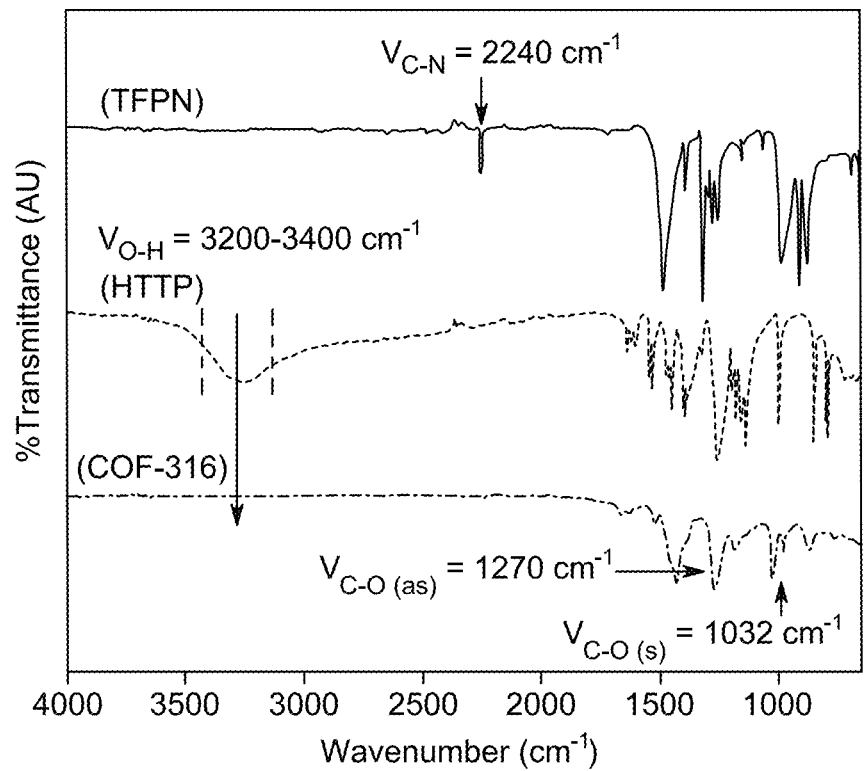
FIG. 1B shows Fourier-transform infrared spectroscopy (FTIR) spectra of 2,3,6,7,10,11-Hexahydroxytriphenylene (HHTP), tetrafluorophthalonitrile (TFPN), and the COF-316, according to certain embodiments.
Figure 1C:
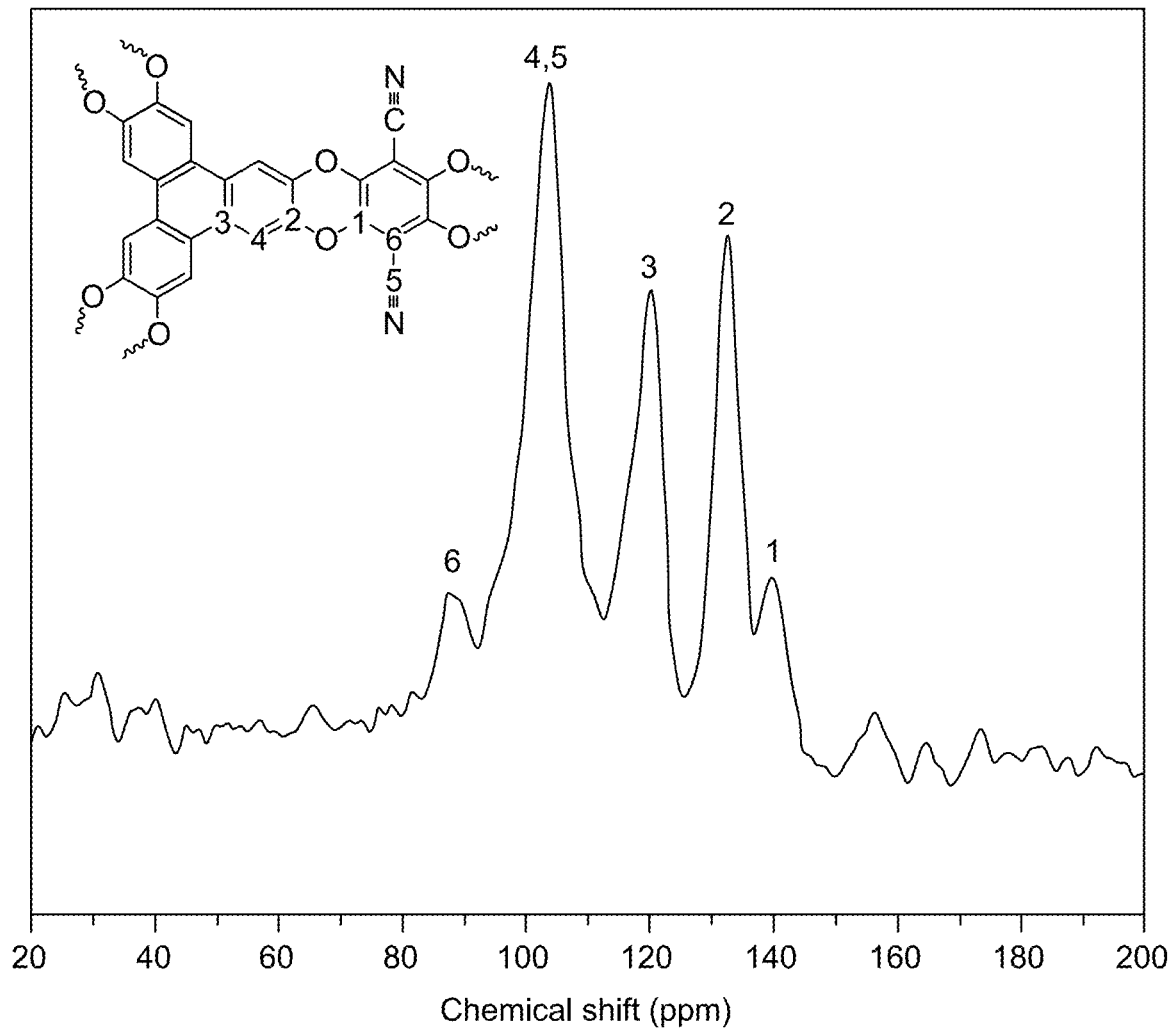
FIG. 1C shows nuclear magnetic resonance (NMR) spectra of the COF-316, according to certain embodiments.

FTIR spectroscopy was used to confirm the conjugation of two starting materials HHTP and TFPN together via a new covalent bond formation and simultaneous disappearance of characteristics peak associated with starting materials. In COF-316, a C—O—C linkage is formed by substituting the fluoride (—F) functional group of one linker with the hydroxy (—OH) functional group of the other (FIG. 1B, FIG. 1E). The formation of two adjacent C—O—C linkage connects two linkers through a 1,4-dioxin ring formation and consequently, the resulting COF-316 is called dioxin COF. FTIR spectra of the COF-316 along with the starting materials are presented in FIG. 1B. Starting material HHTP has six-OH functional groups which convert to C—O—C linkage upon reacting with TFPN. Successful formation of this dioxin linkage is confirmed by the C—O symmetric and asymmetric stretching peaks at 1020 cm$^{-1}$ and 1270 cm$^{-1}$ (FIG. 1C). It is also evident from FIG. 1B that the peak corresponds to the O—H (from HHTP) stretching mode at 3200 to 3410 cm$^{-1}$ attenuated in the COF-316 powder.

$^{13}$C-NMR analysis of the synthesized COF-316 was performed to further confirm the 1,4-dioxin linkage formation. FIG. 1C demonstrates the presence of five distinguished peaks associated with the six different carbon atmospheres within the framework. The resonance signal at 140 represents the C—O bonded carbon attached to the TFPN linker (1), while the signal of C—O bonded carbon present at the HHTP linker appears at 133 (2). The peak corresponding to the aromatic carbon of the HHTP emerged at 120 (3). The most intense peak at 104 represents two carbon atoms; one present in the nitrile functional group in TFPN and another one aromatic carbon, from the HHTP molecule, connected to the C—O linked carbon (4 and 5). Carbon that connected with the nitrile group in TFPN experienced shielding of the nitrile group and consequently appeared at the lowest chemical shift, i.e., 95 ppm (6). The presence of these five distinguished confirms the successful synthesis of COF-316.

Figure 1D:
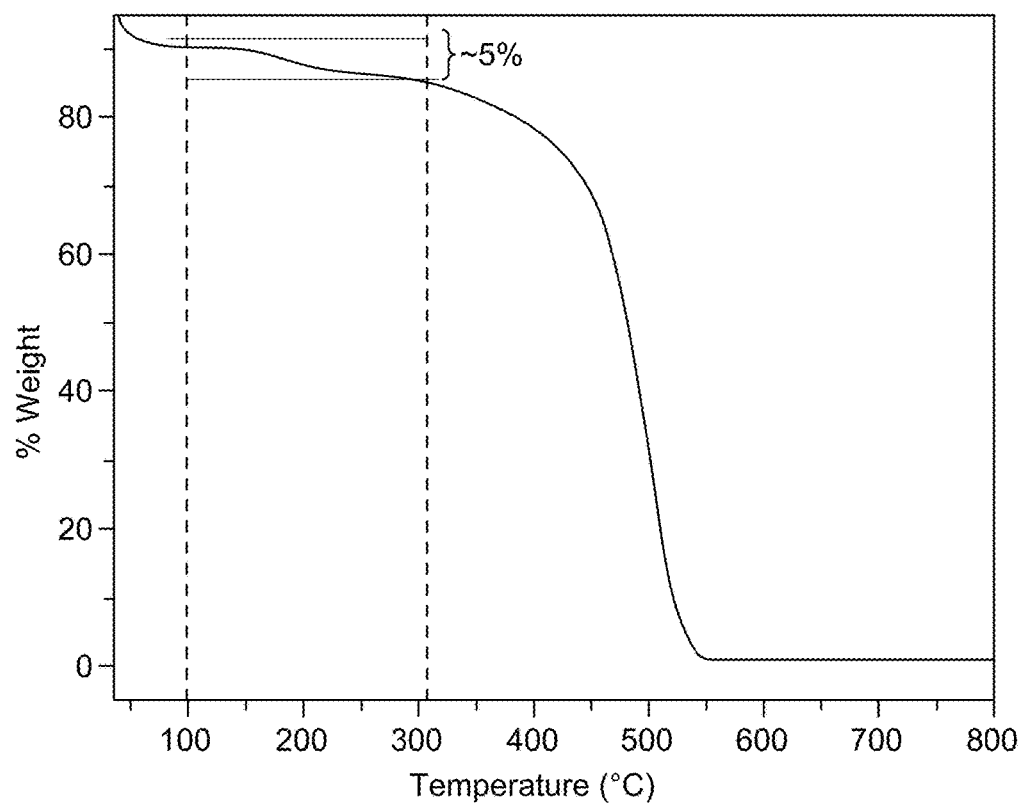
FIG. 1D shows a thermogravimetric (TGA) analysis spectrum of the COF-316, according to certain embodiments.
Figure 1E:
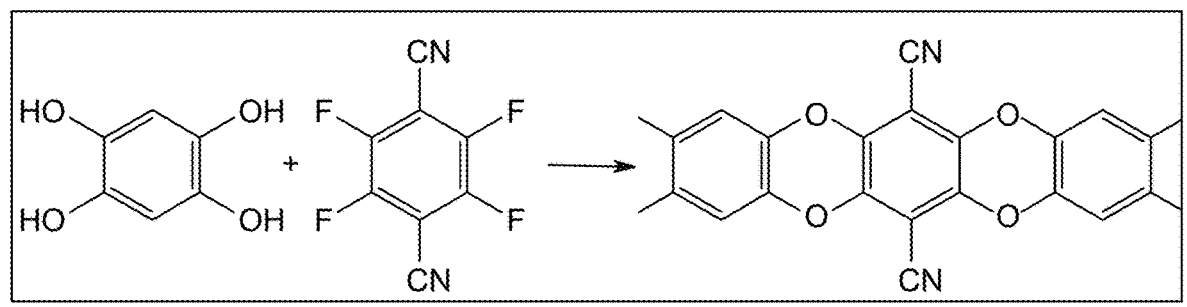
FIG. 1E is a reaction scheme illustrating the formation of a 1,4-dioxin linkage, according to certain embodiments.

FIG. 1D exhibits the thermal stability of the synthesized COF-316 and indicates that there is a minimal weight loss at 100° C. due to the removal of residual solvent trapped within COF material. When the material is heated within the 100-300° C. range, it does not undergo any significant weight reduction. A minor weight loss of about 5% is observed, which may be attributed to the evaporation of entrapped DMF solvent. Subsequent thermal analysis in the 300-400° C. interval indicates that the material's weight stabilizes, suggesting that its structural integrity is preserved without notable deterioration. Only after heating beyond 400° C., sharp degradation of the material weight was noticed which signifies the structural breakdown of the COF network. Overall, COF-316 is stable up to 400° C. and degrades sharply beyond this temperature.

Figure 1F:
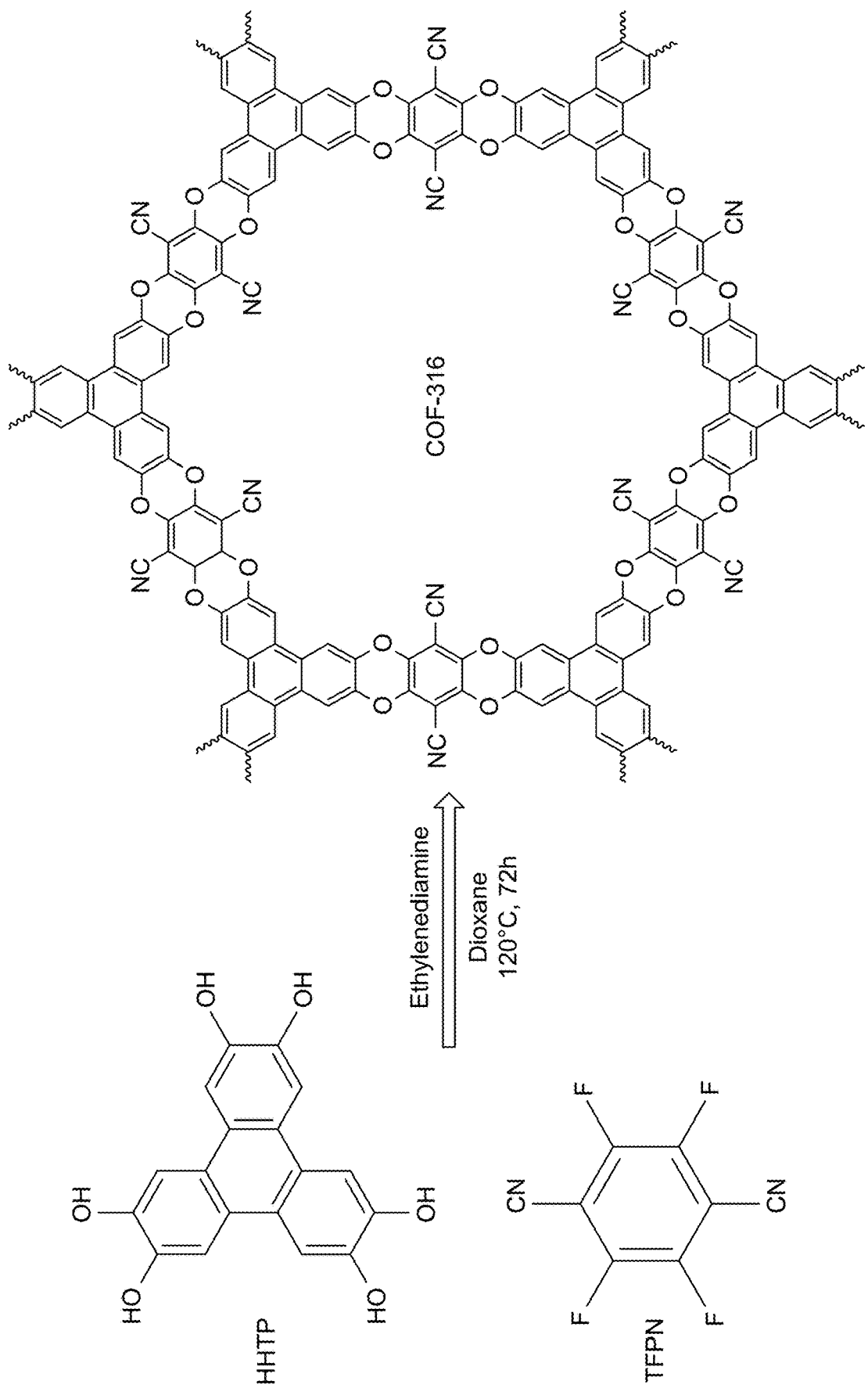
FIG. 1F is a reaction scheme illustrating the COF-316 synthesis, according to certain embodiments.
Figure 2A:
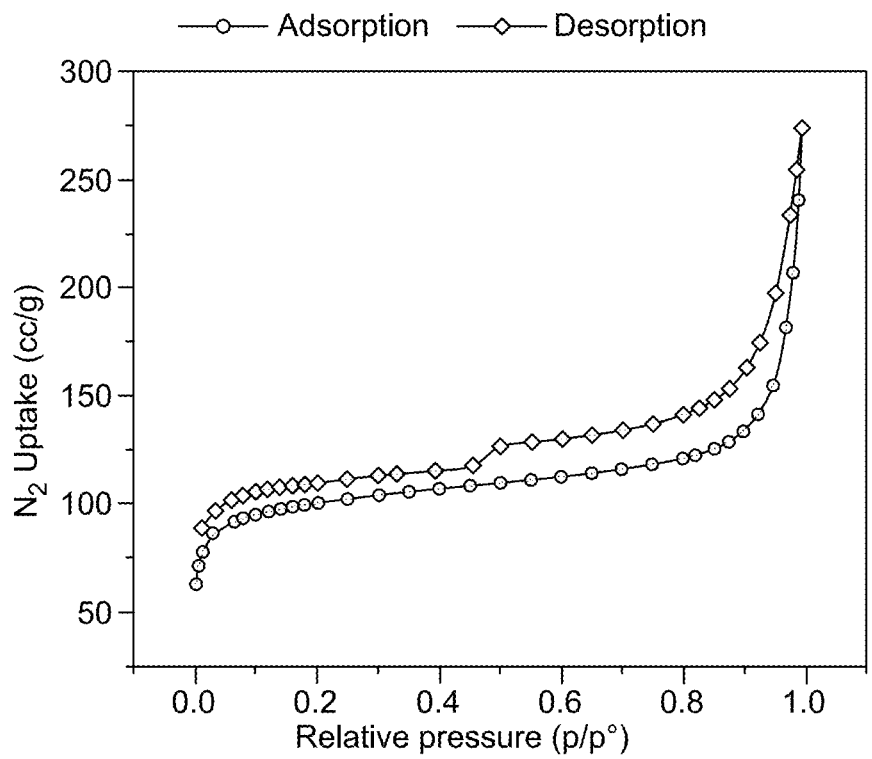
FIG. 2A shows a $N_2$ adsorption-desorption plot of the COF-316 at 77K, according to certain embodiments.

High crystallinity and porosity are the two properties of COFs that support their unique performance over comparable homologous porous polymers. HHTP and TFPN combined and formed hexagonal frameworks (FIG. 1E, FIG. 1F). The directional arrangement of this framework produces crystalline and porous COF material. The surface area and pore volume of the COF-316 were analyzed by measuring $N_2$ adsorption-desorption isotherm at 77K. The surface area calculated by fitting the data with Brunauer-Emmett-Teller (BET) and Langmuir methods was 320 and 470 m$^2$g$^{-1}$, respectively. The difference in surface area calculated based on the two above-mentioned methods is correlated with the assumption considered in the Langmuir (monolayer adsorption on a uniform surface) and BET (multi-layer adsorption where each adsorbed molecule is a potential adsorption site) model. The $N_2$ adsorption-desorption isotherm is presented in FIG. 2A shows hysteresis, which is generally reported to be induced by the sorbate-induced swelling of the microporous materials. This type of hysteresis may also arise due to the presence of 'restricted-access pores' (micropores with narrow openings).

Figure 2B:
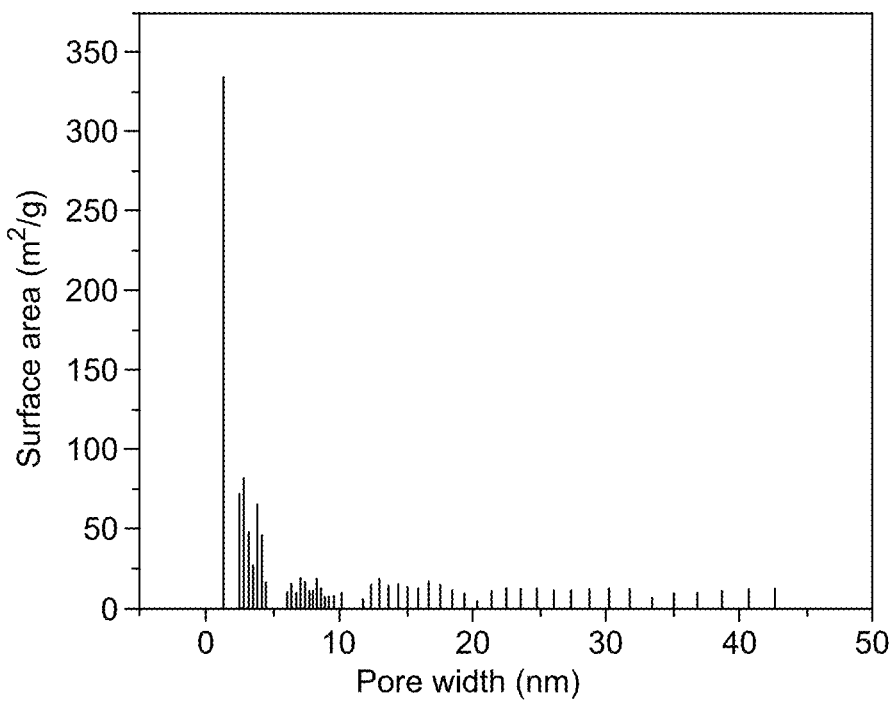
FIG. 2B shows a pore-size distribution curve of the COF-316, according to certain embodiments.

FIG. 2B depicts the pore size distribution histogram calculated from the DFT fitting of the $N_2$ adsorption-desorption isotherm using the NLDFT adsorption branch model. The results confirm the microporous nature of the COF-316 with pore width ranging from 12-15 Å. It is also evident that one particular pore (12-13 Å) is dominant over others and contributes to the material's porosity. This analysis further validates the eclipsed stacking of the COF layers as measured pore size well agrees with the predicted one (12.7 Å). Overall, crystallinity and porosity analysis confirm the successful synthesis of crystalline and microporous COF-316.

Figure 3A:
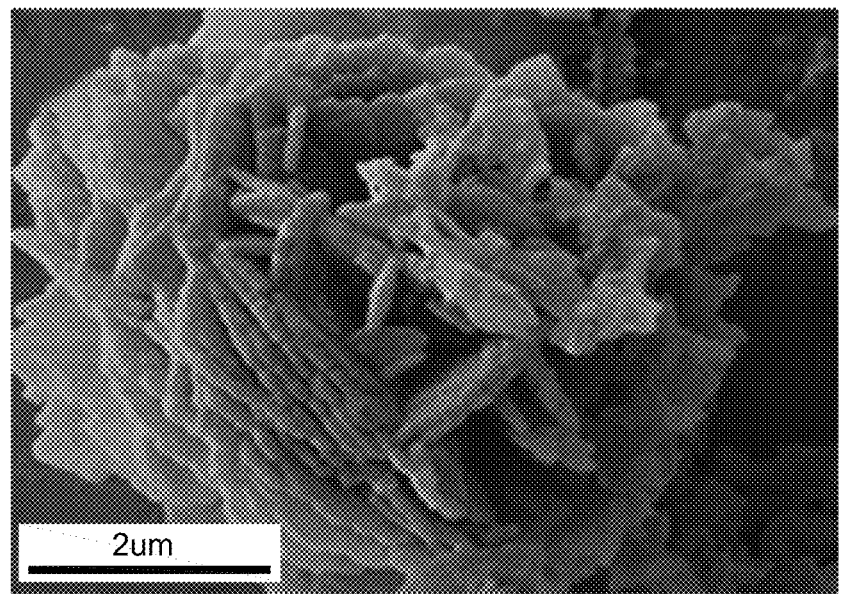
FIG. 3A shows a high-resolution scanning electron microscopic (SEM) image of the COF-316, according to certain embodiments.
Figure 3B:
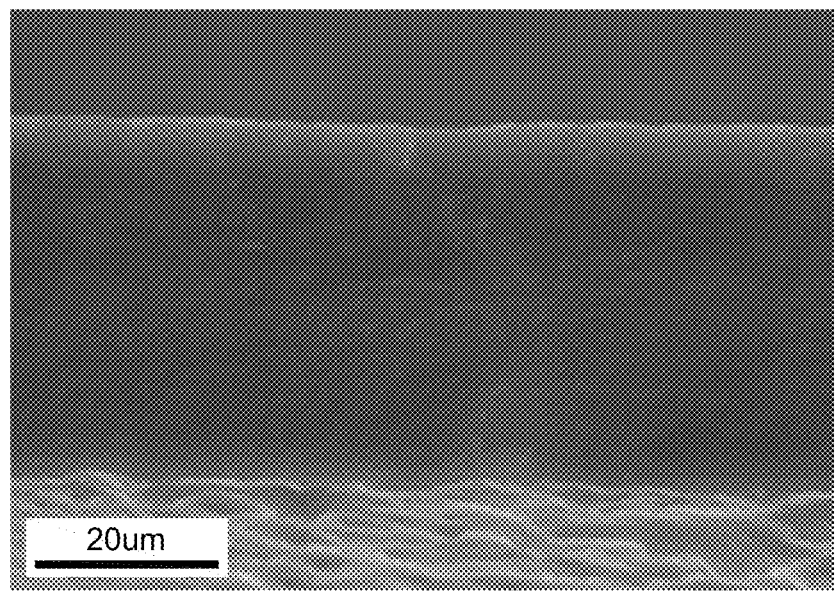
FIG. 3B shows a cross-sectional field emission scanning electron microscopic (FESEM) image of a pure poly(ether-block-amide) (PEBAX)-1657 membrane, according to certain embodiments.
Figure 3C:
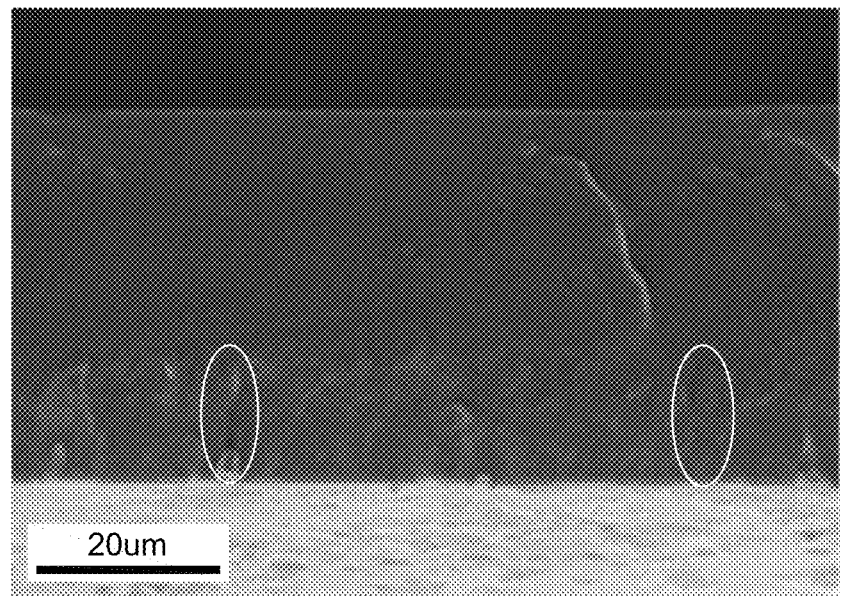
FIG. 3C shows a cross-sectional FESEM image of the PEBAX-1657 membrane loaded with 0.25 wt. % COF-316 to form the mixed-matrix membrane (0.25-MMM), according to certain embodiments.
Figure 3D:
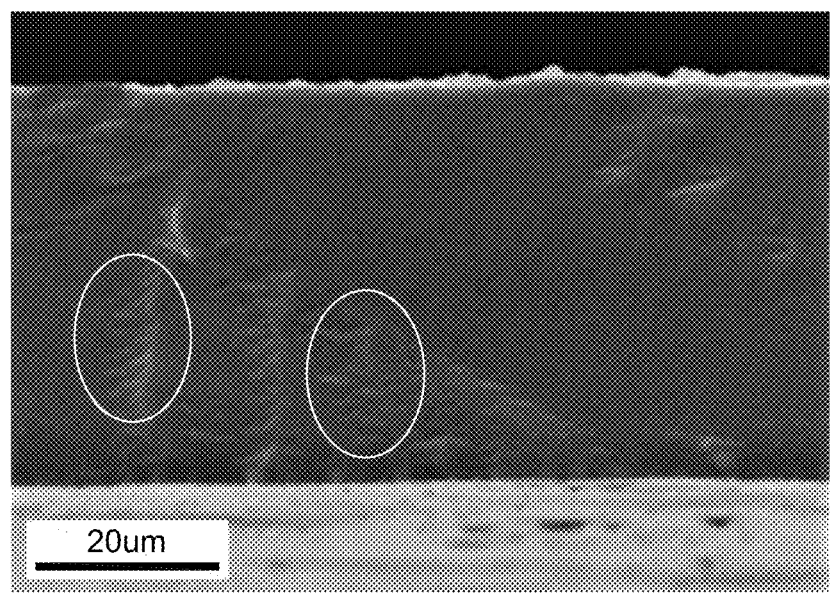
FIG. 3D shows a cross-sectional FESEM image of the PEBAX-1657 membrane loaded with 0.5 wt. % COF-316 to form the mixed-matrix membrane (0.5-MMM), according to certain embodiments.
Figure 3E:
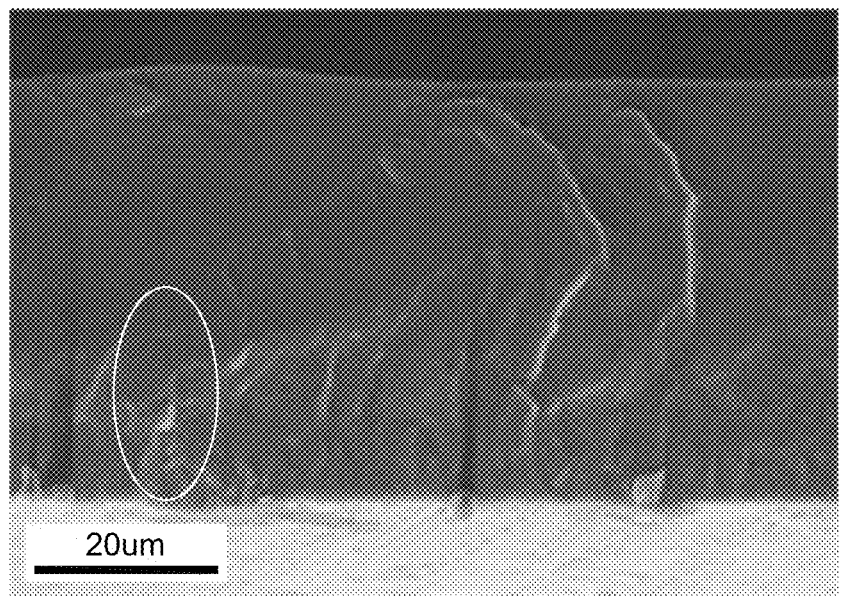
FIG. 3E shows a cross-sectional FESEM image of PEBAX-1657 membrane loaded with 0.75 wt. % COF-316 to form the mixed-matrix membrane (0.75-MMM), according to certain embodiments.
Figure 3F:
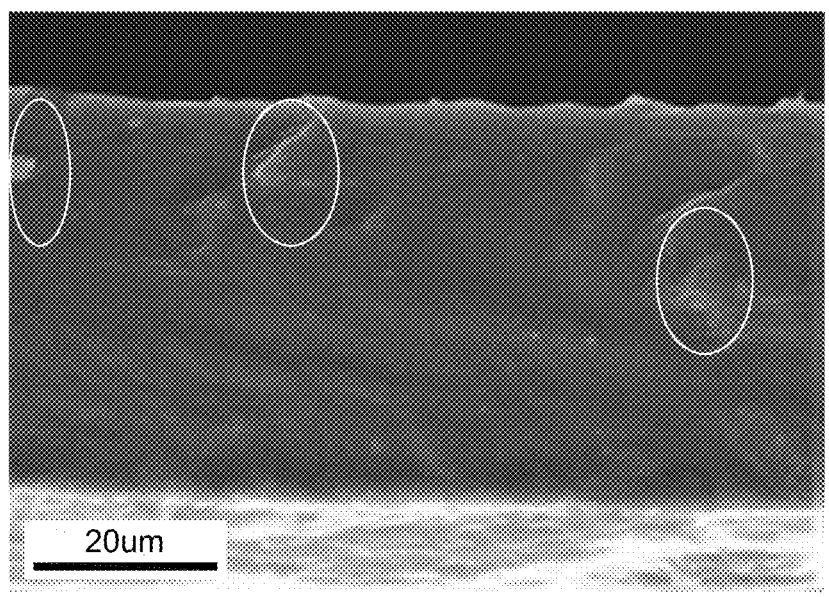
FIG. 3F shows a cross-sectional FESEM image of PEBAX-1657 membrane loaded with 1.0 wt. % COF-316 to form the mixed-matrix membrane (1.0-MMM), according to certain embodiments.

FESEM was employed to examine the surface morphology of the synthesized COF-316 material. The FESEM image in FIG. 3A reveals that the COF-316 material has a sheet-like structure with a thickness of about 10-20 nm. FIGS. 3B-3F illustrates cross-sectional FESEM images of a pure PEBAX-1657 membrane and MMMs with a range of weight percentages (0.25-1.0%) of COF-316 nanofiller. The cross-section of a pure PEBAX-1657 membrane is uniform and smooth (FIG. 3B), but cross-sections of MMMs reveal the presence of non-uniform texture/sheets (FIG. 3C, FIG. 3D, FIG. 3E, FIG. 3F), which confirms the existence of COF-316 nanofiller. At low weight percentages (0.25 & 0.5), the COF-316 nanofiller is evenly dispersed in the matrix, but at high weight percentages (0.75 &1.0), particularly at 1.0 wt. %, aggregation was observed (FIGS. 3E and 3F). However, these aggregates were not visible on the membrane surface. The thickness of the pure and MMMs was measured to be between 50-60 μm by digital micrometer, which was further supported by cross-sectional SEM analysis.

Figure 4A:
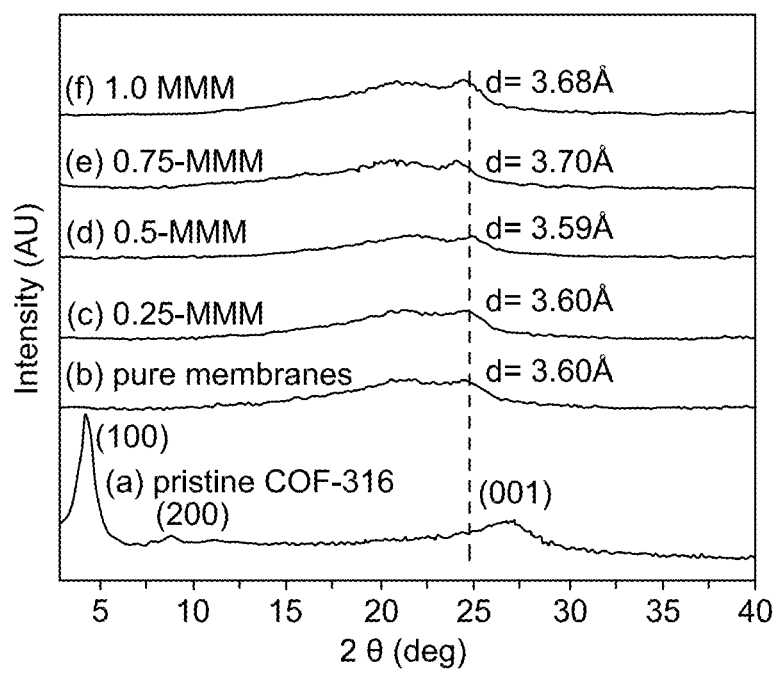
FIG. 4A shows PXRD patterns of pristine COF-316 (a), pure PEBAX-1657 membrane (b), 0.25-MMM (c), 0.5 MMM (d), 0.75 MMM (e), and 1.0 MMM (f), according to certain embodiments.

FIG. 4A shows the PXRD plots of the prepared COF-316 and membranes with different wt. % (0-1%) of the COF filler. The resultant COF-316 alone in FIG. 4A (a) shows 100, 200, and 001 planes at 2θ values of 4.3, 8.8, and 27.1°, respectively, in agreement with earlier reports indicating successful synthesis of COF-316. XRD of pristine PEBAX-1657 in FIG. 4A (b) membrane shows a broad peak (2θ=15-

23°) corresponding to amorphous PE (polyether) and a relatively sharp peak at around 24.6° corresponding to the semi-crystalline polyamide segments which come close to each other by moderately stronger hydrogen bonds.

MMMs (FIG. 4A (c-f)) don't show characteristic peaks of COF-316, due to very low COF-316 loading; however, the polymer XRD peak at 24.6 shifts slightly towards the left, indicating the increase in d-spacing. The Brags equation calculations indicate that the d-spacing increases from 3.60 Å in pure PEBAX-1657 to 3.68 Å in 0.75% COF-loaded composite and remains constant at higher loadings. This is due to the weak interaction of the pi-electron clouds of COF-316 with the PEBAX-1657 polymer's N—H groups, which weakens the amide interactions and leads to increased d-spacing.

Figure 4B:
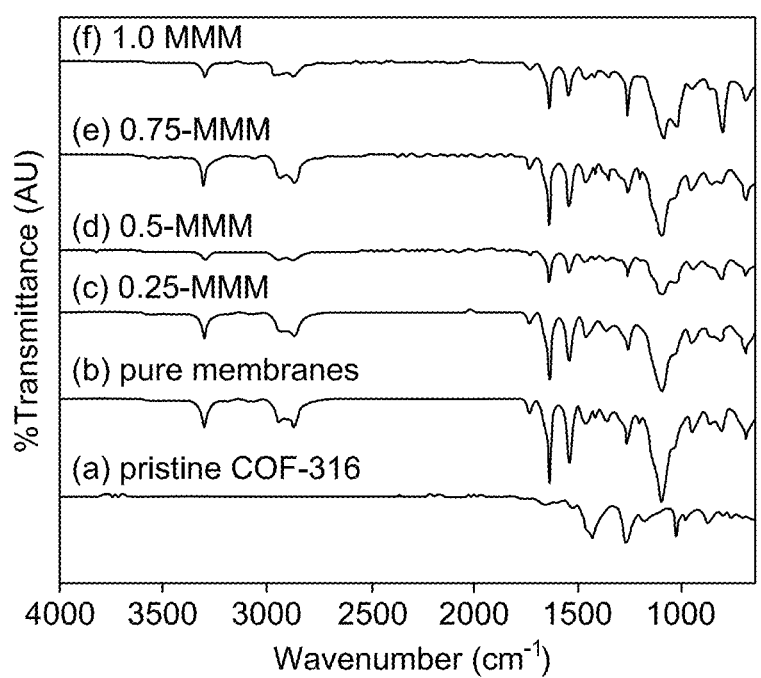
FIG. 4B shows FTIR spectra of pristine COF-316 (a), pure PEBAX-1657 membrane (b), 0.25-MMM (c), 0.5 MMM (d), 0.75 MMM (e), and 1.0 MMM (f), according to certain embodiments.

To gain insights into the different functional groups of pristine materials and mixed membranes, FTIR spectra are plotted in FIG. 4B. Pristine COF-316 shows diagnostic peaks of dioxin bonds at 1270 $cm^{-1}$ and 1020 $cm^{-1}$ in addition to peaks corresponding to C—C stretch of aromatic rings at 1427 $cm^{-1}$ (FIG. 4B (a)). Pure PEBAX-1657 membrane shows several FTIR intense peaks at 3298 $cm^{-1}$ and 1637 $cm^{-1}$ can be assigned to —NH and —CONH functional groups of the polyamide segments. The peaks at 1100 $cm^{-1}$ and 1735 $cm^{-1}$ indicate C—O and C═O stretching of the polyether segments. In addition to this, peaks at 2867 $cm^{-1}$ and 2942 $cm^{-1}$ are from different C—H stretching modes. FTIR spectra of composites don't show the appearance of any new peaks when compared with the pristine analogues, indicating that the composite membranes are majorly formed as a result of physical blending with weaker interactions rather than any strong chemical bonding interaction. In the MMMs containing 1% COF, depicted in FIG. 4B (b-f), the peak intensity and visual distinction from other MMMs are attributed to COF agglomeration. This agglomeration accentuates COF-related peaks and causes them to blend with PEBAX-1657 peaks, creating a shoulder at approximately 1100 $cm^{-1}$ and amplifying intensity at 1270 $cm^{-1}$ and 800 $cm^{-1}$.

Free volume is determined to identify and comprehend the relationship between gas permeability and membrane properties such as polymeric chain configurations, structure, and mobility. Measured density values of both neat membrane and MMMs are used to calculate the free fractional volume (FFV) and specific fractional volume (SFV) following the mathematical expression (eq. 5 and eq. 6). Calculated FFV and SFV values are presented in Table 1.

$$FFV = 1 - 1.3 v_w \rho_p \quad (5)$$

$$SFV = 1/\rho_p - 1.30 v_w \quad (6)$$

The term $\rho_p$ represents the density of PEBAX-1657, and $v_w$ stands for the van der Waal's volume (0.590 $cm^3$ g 1) of the PEBAX-1657 repeating unit.

TABLE 1

Free volume assessment of the pure membrane and MMMs.

| Membranes | Density (g/cm³) | FFV (%) | SFV (%) |
|---|---|---|---|
| Pure | 1.168 | 10.4 | 8.9 |
| 0.25-MMM | 1.115 | 14.4 | 12.9 |
| 0.5-MMM | 1.041 | 20.1 | 19.3 |
| 0.75-MMM | 1.073 | 17.6 | 16.4 |
| 1.0-MMM | 1.087 | 16.5 | 15.2 |

The effect of COF-316 nanosheets on the permeability and separation performance of the mixed-matrix membranes was investigated by varying the filler loading from 0.25-1.0 wt. %. The permeability of a gas through a membrane is affected by its polymer matrix structure, configuration, packing, and the mobility or flexibility of different segments. A measurement of the void space within the polymer matrix that permits gas molecules to permeate through is called the free volume of the membrane. The PE segment in the PEBAX-1657 membrane has a high solubility selectivity for polar gas molecules like $CO_2$ due to its strong affinity, provided that the PE segment does not interfere with the arrangement or the diffusivity component PA6. The two parameters for quantifying free volume are FFV and SFV. Data presented in Table 1 shows that the addition of dioxin-linked COF significantly affects the density, FFV, and SFV of the PEBAX-1657 membrane. The MMMs with COF-316 filler have a lower density and higher free volume compared to the pure membrane. When COF-316 nanosheets are added to the PEBAX-1657 polymer matrix, disruption in the packing of neighboring polymer chains is anticipated, which can alter the free volume. Among the MMMs, the membrane with 0.5 wt. % COF-316 showed the highest FFV and SFV values, which implies that COF-316 loading creates more pathways for gas transfer through the conduits. However, a further increase in filler loading to 1 wt. % decreased both FFV and SFV values owing to the aggregation of COF-316 nanosheets in the membrane matrix.

Example 7: Membrane Performance

Figure 5A:
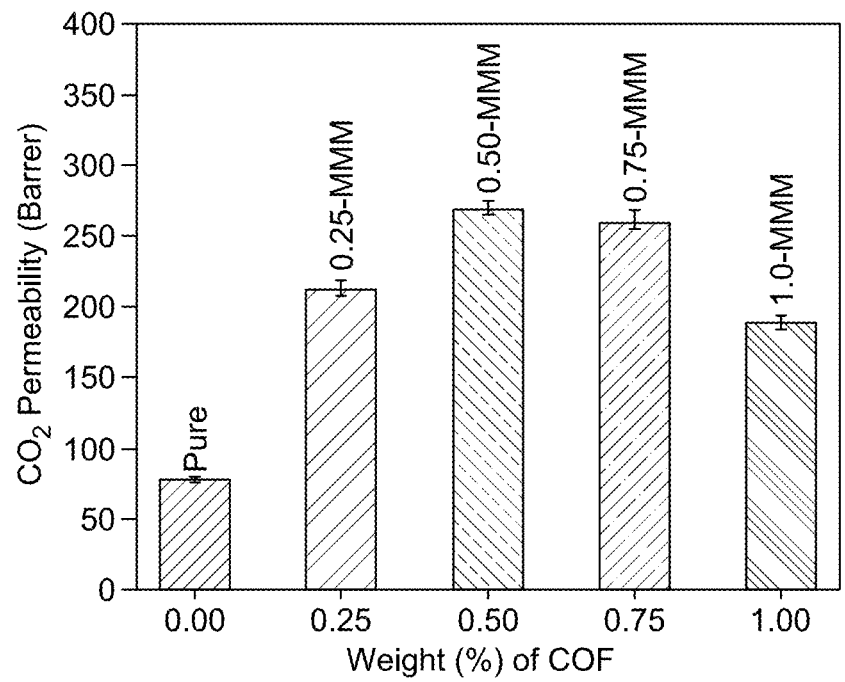
FIG. 5A shows the effect of different wt. % of COF-316 on the $CO_2$ permeabilities of pure and MMMs at 25° C. and 1 bar, according to certain embodiments.
Figure 5B:
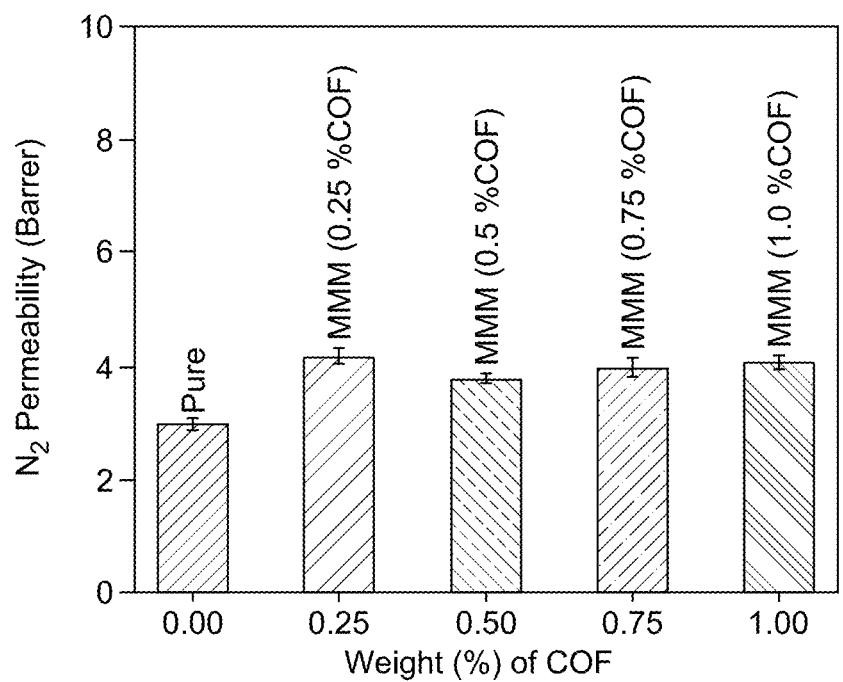
FIG. 5B shows the effect of different wt. % of COF-316 on the $N_2$ permeabilities of pure and MMMs at 25° C. and 1 bar, according to certain embodiments.
Figure 5C:
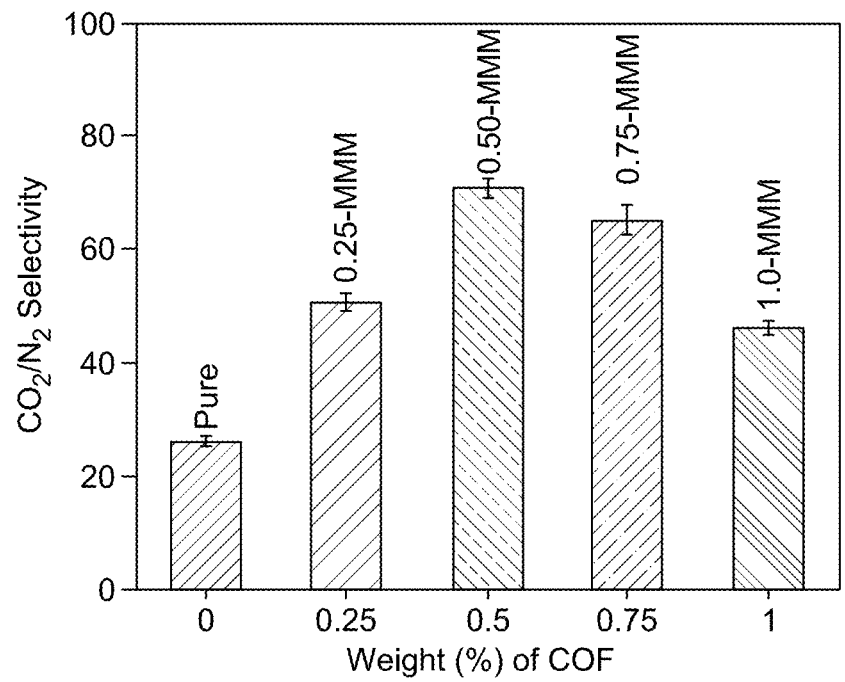
FIG. 5C shows the effect of different wt. % of COF-316 on the $CO_2/N_2$ selectivity of pure and MMMs at 25° C. and 1 bar, according to certain embodiments.

The effects of COF-316 loading (0.0-1.0 wt. %) on the gas separation performance of pure and MMMs were investigated for $CO_2$ and $N_2$ at 1 bar and 25° C. FIGS. 5A-5C shows the permeability and ideal selectivity values of the membranes as a function of COF-316 content. The permeability of $CO_2$ and $N_2$ for the pure and MMMs are shown in FIGS. 5A and 5B, respectively. FIG. 5C displays the $CO_2/N_2$ ideal selectivity, which is determined as the ratio of their permeabilities derived from Eq. 3 and 4.

It is observed that the $CO_2$ permeabilities increase with increasing COF-316 content up to a point (0.5 wt. % COF-316), after which the $CO_2$ permeability either levels off or declines. The $CO_2$ permeabilities and ideal selectivity of all the MMMs (0.25-1.0 wt. %) are higher than those of the pure PEBAX-1657 membrane. The $N_2$ permeabilities of MMMs also showed a slight increase (FIG. 5B), while the $CO_2$ permeabilities improved more. This is attributed to newly generated voids due to COF-316 nanofillers and the strong dipole-quadrupole interactions between PE chains/nitrile group and polar gases such as $CO_2$. The MMM with 0.5 wt. % of COF-316 (denoted as 0.5-MMMs) exhibited the best performance in terms of $CO_2$ permeability and $CO/N_2$ selectivity enhancement.

Figure 6A:
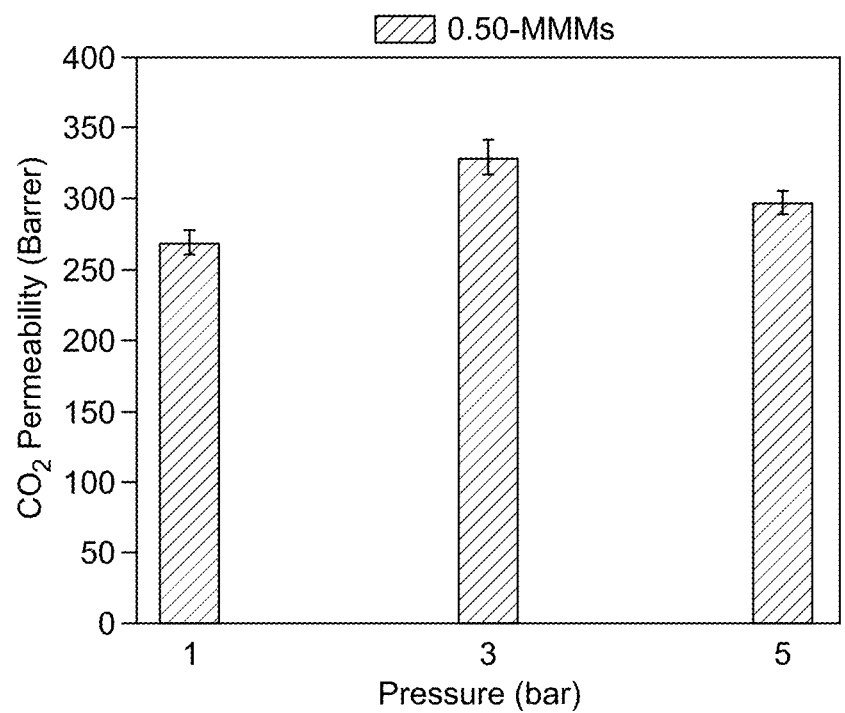
FIG. 6A shows the effect of pressure from 1-5 bars on the $CO_2$ permeability of the MMM with 0.5 wt. % COF-316 filler at 25° C., according to certain embodiments.
Figure 6B:
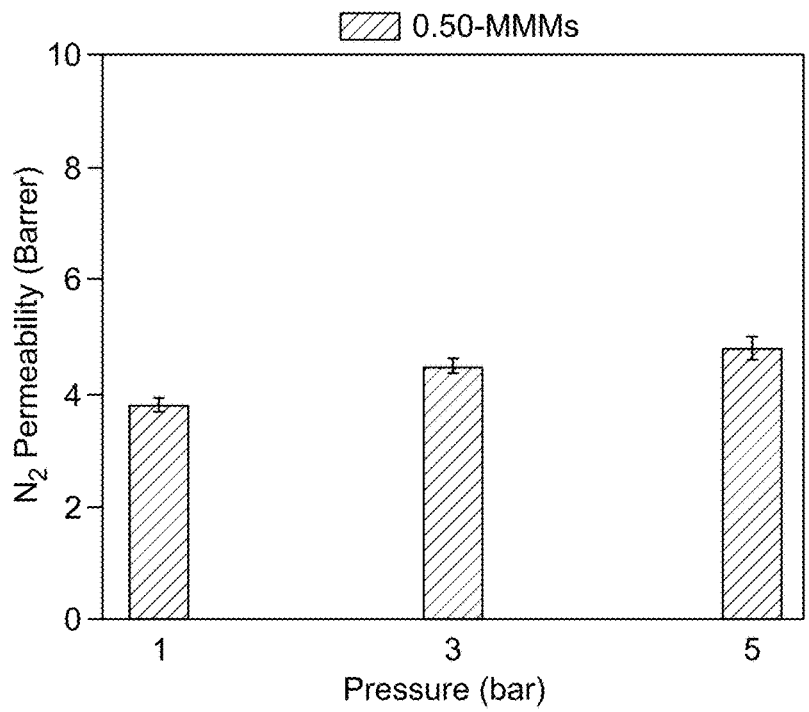
FIG. 6B shows the effect of pressure from 1-5 bars on the $N_2$ permeability of the MMM with 0.5 wt. % COF-316 filler at 25° C., according to certain embodiments.
Figure 6C:
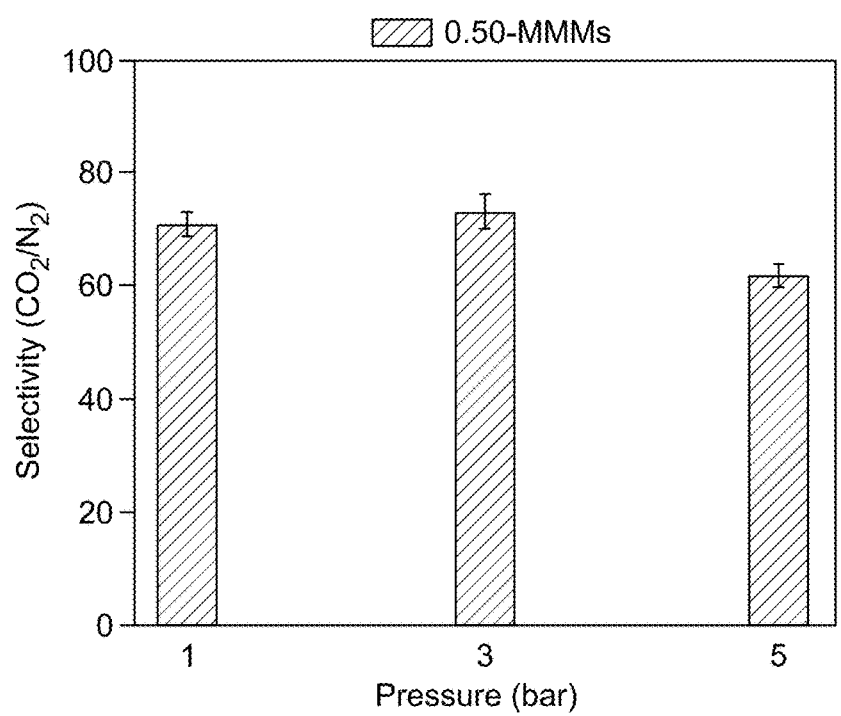
FIG. 6C shows the effects of pressure from 1-5 bars on the $CO_2/N_2$ selectivity of the MMM with 0.5 wt. % COF-316 filler at 25° C., according to certain embodiments.

Moreover, the performances of 0.5-MMMs were evaluated for their ability to separate pure $CO_2$ and $N_2$ gases under different pressures (1, 3, and 5 bars) and at a constant temperature of 25° C. The results are presented in FIGS. 6A-6C, where the permeability and ideal selectivity of the optimized membrane are plotted against the feed pressures. As shown in FIG. 6A, the $CO_2$ permeabilities exhibited a pressure-dependent behavior. They increased when the pressure was raised from 1 bar to 3 bar, indicating a higher driving force for $CO_2$ transport across the membrane. However, $CO_2$ permeabilities decreased when the pressure was further increased to 5 bar, which could be due to the compaction of the membrane structure under high pressure. Consequently, the impact of pressure on gas permeability was elucidated by the competing hydrostatic pressure and plasticization effects; while increasing feed pressure leads to augmented $CO_2$ absorption, it also reduces membrane-free volume due to the compaction effect. The $CO_2$ permeability of the MMMs increased compared to $N_2$ (shown in FIG. 6B), resulting in higher $CO_2/N_2$ ideal selectivity as illustrated in FIG. 6C. This indicates that the gas separation performance can be obtained by using the 0.5-MMMs at 3 bar pressure.

Figure 7A:
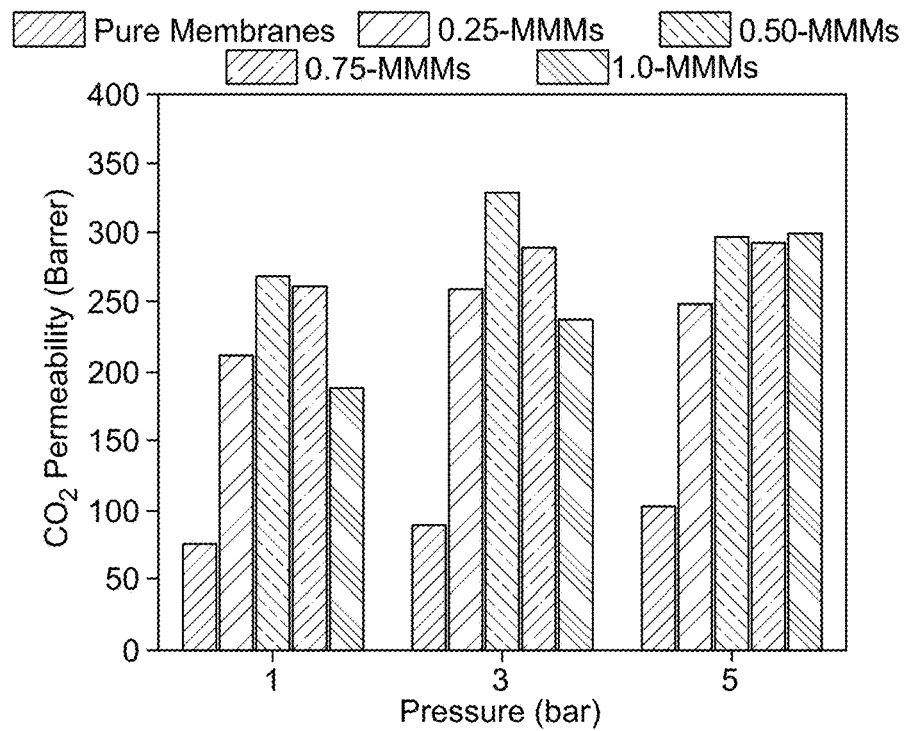
FIG. 7A shows the effect of the feed gas pressure (1-5 bars) and filler percentage on the $CO_2$ permeability of pure and MMMs at 25° C., according to certain embodiments.

Other MMMs (0.25, 0.75, and 1.0% filler loaded) were further studied at higher pressure (3 and 5 bar). All pressure ranges between 1-5 bars displayed the same $CO_2$ permeability pattern (FIGS. 7A-7C) with increasing COF-316 content up to 0.5 wt. % COF-316. However, when the filler concentration reached 1%, the gas permeability did not saturate at 3 bar, and both $CO_2$ and $N_2$ permeabilities increased as the pressure rose from 3 to 5 bar. This anomalous behavior can be explained by the filler rearrangement at higher pressure within the membrane. At higher filler loading, local agglomeration of filler is feasible, and disruption of this agglomeration at higher pressure increases the gas permeability.

Figure 7B:
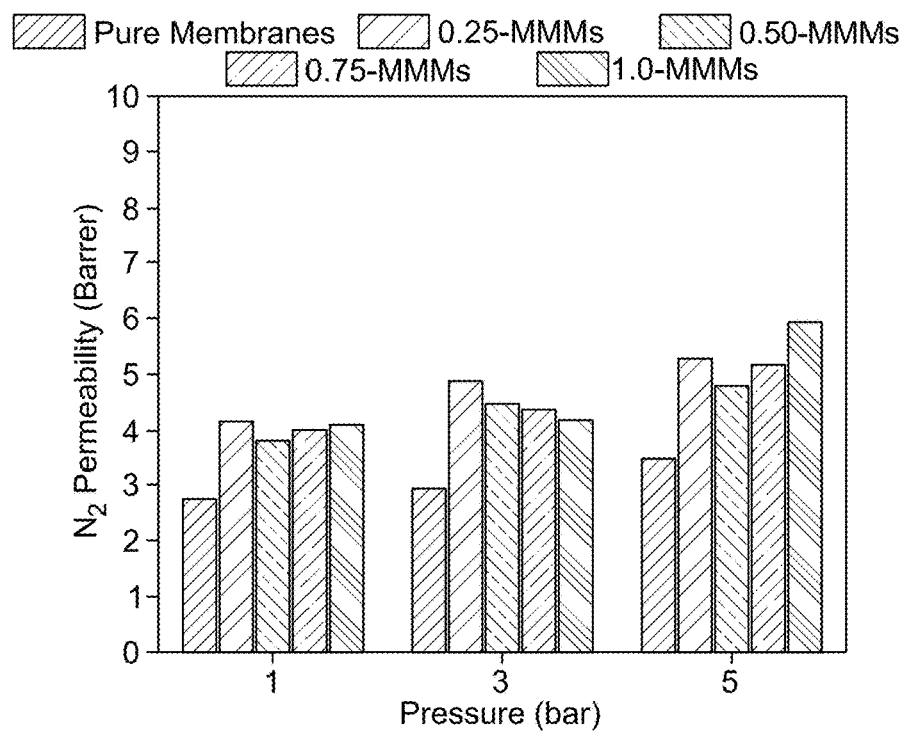
FIG. 7B shows the effect of the feed gas pressure (1-5 bars) and filler percentage on the $N_2$ permeability of pure and MMMs at 25° C., according to certain embodiments.
Figure 7C:
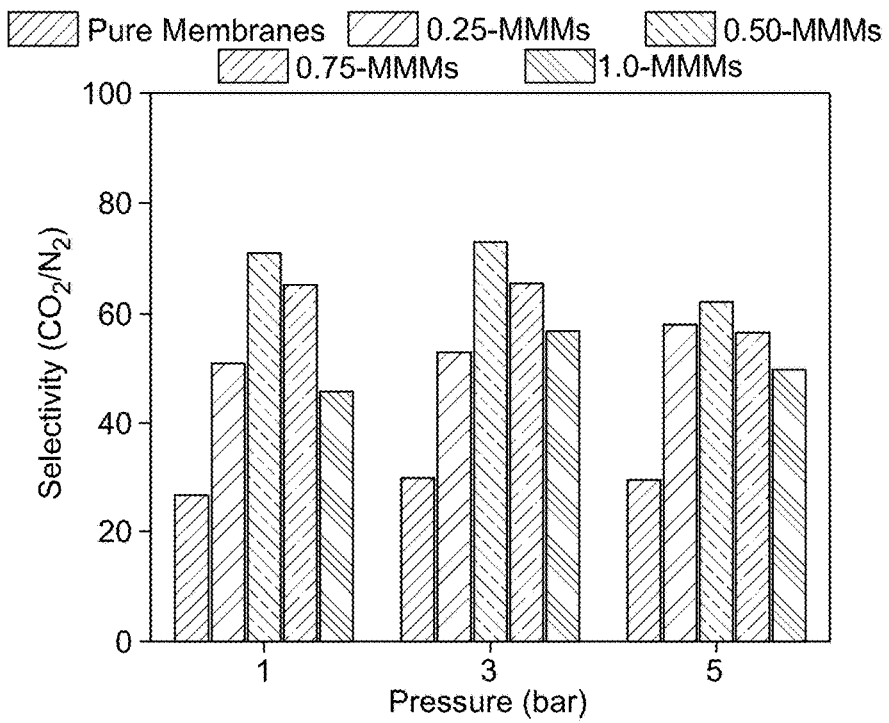
FIG. 7C shows the effect of the feed gas pressure (1-5 bars) and filler percentage on the $CO_2/N_2$ selectivity of pure and MMMs at 25° C., according to certain embodiments.
Figure 8:
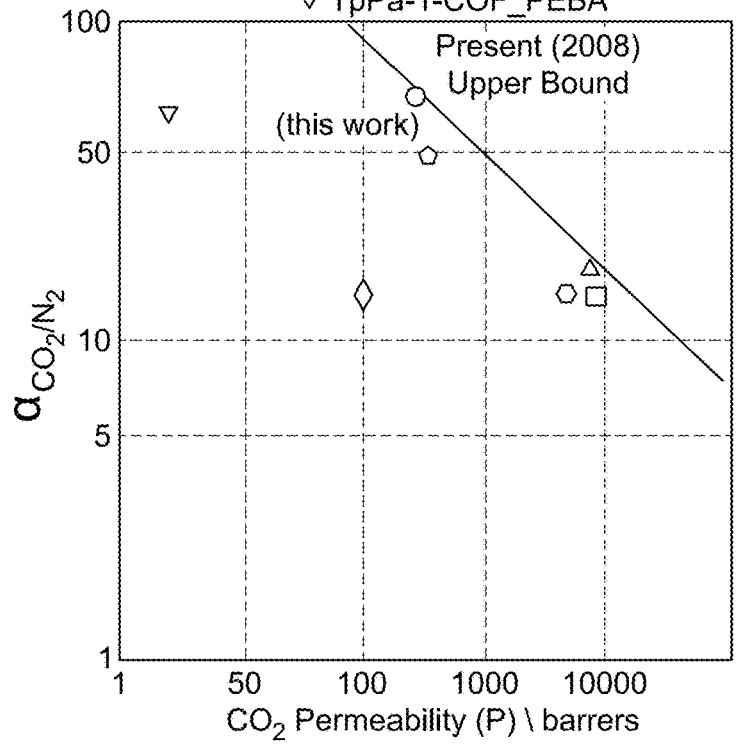
FIG. 8 compares the $CO_2$ separation performance of the COF-based MMMs (present disclosure and reported literature) on the Robeson's Upper Bound, according to certain embodiments.

The results indicate that the incorporation of COF-316 into the polymer matrix enhances the gas transport performance of the membranes up to 0.5 wt. % filler concentration, beyond which further addition of COF-316 may have a negative impact on the membrane structure and properties. This correlates well with the increment of additional FFV generated by COF-316 2D sheets up to 0.5 wt. % filler content (Table 1). One possible explanation for the enhanced $CO_2$ permeability compared with $N_2$ is the presence of nitrile group on COF-316 and the 2D sheet structure, which disrupts the packing of the polymer chains and causes a rise in $CO_2$ permeabilities with the preferable interaction. However, the $N_2$ permeabilities of the MMMs are not enhanced by the incorporation of COF-316 2D sheet into the polymer matrix, as shown in FIG. 7B. Hence, the $CO_2/N_2$ ideal selectivity value was observed for MMM, including 0.5 wt. % COF-316 nanosheets (FIG. 7C). This outcome is correlated with the filler enhancement index ($F_{index}$) value calculated from eq. 5. The findings shown in Table 2 reveal that MMM containing 0.5 wt. % of COF-316 fillers had the highest $F_{index}$ value, which is consistent with the permeation results obtained utilizing 0.5-MMM.

$$F_{index} = \ln\left(\frac{P_{MMM(0.0-1.0)}}{P_{neat}}\right) + \eta \ln\left(\frac{\alpha_{MMM(0.0-1.0)}}{\alpha_{neat}}\right) \quad (5)$$

The permeability of PEBAX-1657 MMMs containing 0.0-1.0 wt. % of filler (COF-316) is denoted by MMM (0.0-1.0) in the equation above, while $P_{neat}$ represents the permeability of the pure PEBAX-1657 membrane without filler. The MMMs (with 0.25-1.0 wt. %) and the pure PEBAX-1657 membrane have $CO_2/N_2$ selectivity values of $\alpha_{MMM}$ (0.25-1.0) and $\alpha_{neat}$, respectively. The enhancement coefficient n, which is 2.888 based on the 2008 Robeson upper bound slope for $CO_2/N_2$, is used to compare them.

TABLE 2

Gas separation properties of pure and MMMs at 3 bars.

| Membranes | $CO_2$ Permeability (barrer) | $CO_2/N_2$ | $F_{index}$ |
|---|---|---|---|
| Pure | 89.5 | 29.84 | — |
| 0.25-MMM | 260 | 53.10 | 1.35 |
| 0.5-MMM | 330 | 73.40 | 2.52 |
| 0.75-MMM | 290 | 65.90 | 2.08 |
| 1.0-MMM | 240 | 57.14 | 1.48 |

It is evident from the results presented in Table 2, that the $CO_2/N_2$ selectivity also increased with increasing COF-316 content, reaching a maximum value of 73.4 at 0.5 wt. % loading (FIG. 6C). This value is more than double that of the pure membrane (29.8). The high selectivity of these MMMs is associated with the selection of porous filler material which has multiple pendant nitrile (—CN) functionalities within the pore. Preferable interaction of —CN with $CO_2$ selectively passes the $CO_2$ through the pore while $N_2$ is retarded being a nonpolar gas. The role of the —CN functionality can further be asserted by comparing the other MMMs holding COFs as a filler material.

Table 3 shows a comparison of different MMMs containing COFs as a filler material. Comparing the present study with the reported literature, it is evident that the pensive selection of COF with a pendant functional group capable of interacting with $CO_2$ can enhance the selective separation of $CO_2$.

TABLE 3

Comparison of different MMMs containing COFs as a filler material

| Polymer | Filler (%) | Wt. (%) | Pres. (Bar) | Temp. (° C.) | $PCO_2$ (barrer) | $PN_2$ (barrer) | $\alpha 2 = CO_2/N_2$ |
|---|---|---|---|---|---|---|---|
| PEBAX-1657[a] | COF-5 | 0.4 | 3 | 25 | 493 | 10.0 | 49.3 |
| PEBA[b] | COF-TpPa-1 | 1.0 | 3 | 25 | 15 | 0.23 | 64.0 |
| Polybenziidazole- | COF-TpPa-1 | 40* | 20 | 35 | 5 | 0.24 | 20.9 |
| t-butylisophthalic acid (PBI-BuI)[c] | COF - TpBD | 50* | 20 | 35 | 14.8 | 0.64 | 23.0 |
| PEGMEA and PEGDA[d] | Viologen COF | 1.23 | 5 | 35 | 803.9 | 13.1 | 61.4 |
| 6FDA-DAM[e] | COF-300 | 7 | 1 | 25 | 1200 | 36.4 | 33.0 |
| PEBAX series[e] | COF-300 | 10 | 1 | 25 | 100 | 5 | 20 |
| PIM-1[f] | TpTta-COF | 6 | 3 | 25 | 9587 | 381.9 | 25.1 |
| PIM-1[g] | SNW-1 | 10 | 2 | 30 | 7553 | 332.7 | 22.7 |

TABLE 3-continued

Comparison of different MMMs containing COFs as a filler material

| Polymer | Filler | Wt. (%) | Pres. (Bar) | Temp. (° C.) | PCO$_2$ (barrer) | PN$_2$ (barrer) | α2 = CO$_2$/N$_2$ |
|---|---|---|---|---|---|---|---|
| PIM-1[h] | TD-COF | 3 | 1 | 30 | 9750 | 369.3 | 26.4 |
| PIM-1[i] | TPB-DMTP-COF | 3 | 1 | 30 | 9137.7 | 452.3 | 20.2 |
| PEBAX-1657 | This work | 0.5 | 3 | 25 | 330 | 4.49 | 73.4 |

*Based on the total weight of solid materials (Polymer and COF)
[a] K. Duan, J. Wang, Y. Zhang, J. Liu, Covalent organic frameworks (COFs) functionalized mixed matrix membrane for effective CO$_2$/N$_2$ separation, J. Memb Sci 572 (2019) 588-595.
[b] C. Zou, Q. Li, Y. Hua, B. Zhou, J. Duan, W. Jin, Mechanical Synthesis of COF Nanosheet Cluster and Its Mixed Matrix Membrane for Efficient CO2 Removal, ACS Appl Mater Interfaces 9 (2017) 29093-29100. https://doi.org/10.1021/acsami.7b08032.
[c] B.P. Biswal, H.D. Chaudhari, R. Banerjee, U.K. Kharul, Chemically Stable Covalent Organic Framework (COF)-Polybenzimidazole Hybrid Membranes: Enhanced Gas Separation through Pore Modulation, Chemistry - A European Journal 22 (2016) 4695-4699.
[d] Y. Zhang, L. Ma, Y. Lv, T. Tan, Facile manufacture of COF-based mixed matrix membranes for efficient CO$_2$ separation, Chemical Engineering Journal 430 (2022) 133001.
[e] Y. Cheng, L. Zhai, Y. Ying, Y. Wang, G. Liu, J. Dong, D.Z.L. Ng, S.A. Khan, D. Zhao, Highly efficient CO2 capture by mixed matrix membranes containing three-dimensional covalent organic framework fillers, J Mater Chem A Mater 7 (2019) 4549-4560.
[f] G. Dai, Q. Zhang, S. Xiong, L. Deng, Z. Gao, A. Chen, X. Li, C. Pan, J. Tang, G. Yu, Building interfacial compatible PIM-1-based mixed-matrix membranes with β-ketamine-linked COF fillers for effective CO$_2$/N$_2$ separation, J Memb Sci 676 (2023) 121561.
[g] X. Wu, Z. Tian, S. Wang, D. Peng, L. Yang, Y. Wu, Q. Hin, H. Wu, Z. Jiang, Mixed matrix membranes including polymers of intrinsic microporosity and covalent organic framework for gas separation, J Memb Sci 528 (2017) 2730283.
[h] X. Chang, H. Guo, Q. Chang, Z. Tian, Y. Zhang, D. Li, J. Wang, Y. Zhang, Mixed-matrix membranes composed of dopamine modified covalent organic framework and PIM-1 for efficient CO$_2$/N$_2$ separation, J Memb Sci 686 (2023) 122017
[i] Q. Chang, H. Guo, Z. Shang, C. Zhang, Y. Zhang, G. Dong, B. Shen, J. Wang, Y. Zhang, PIM-based mixed matrix membranes containing covalent organic frameworks/ionic liquid composite materials for effective CO$_2$/N$_2$ separation, Sep Purif Technol 330 (2024) 125518, each of [a]-[i] is incorporated herein by reference..

[a] K. Duan, J. Wang, Y. Zhang, J. Liu, *Covalent organic frameworks (COFs) functionalized mixed matrix membrane for effective CO$_2$/N$_2$ separation, J Memb Sci* 572 (2019) 588-595.

[b] C. Zou, Q. Li, Y. Hua, B. Zhou, J. Duan, W. Jin, *Mechanical Synthesis of COF Nanosheet Cluster and Its Mixed Matrix Membrane for Efficient CO$_2$ Removal, ACS Appl Mater Interfaces* 9 (2017) 29093-29100. https://doi.org/10.1021/acsami.7b08032.

[c] B. P. Biswal, H. D. Chaudhari, R. Banerjee, U. K. Kharul, *Chemically Stable Covalent Organic Framework (COF)-Polybenzimidazole Hybrid Membranes: Enhanced Gas Separation through Pore Modulation, Chemistry—A European Journal* 22 (2016) 4695-4699.

[d] Y. Zhang, L. Ma, Y. Lv, T. Tan, *Facile manufacture of COF-based mixed matrix membranes for efficient CO$_2$ separation, Chemical Engineering Journal* 430 (2022) 133001.

[e] Y. Cheng, L. Zhai, Y. Ying, Y. Wang, G. Liu, J. Dong, D. Z. L. Ng, S. A. Khan, D. Zhao, *Highly efficient CO$_2$ capture by mixed matrix membranes containing three-dimensional covalent organic framework fillers, J Mater Chem A Mater* 7 (2019) 4549-4560.

[f] G. Dai, Q. Zhang, S. Xiong, L. Deng, Z. Gao, A. Chen, X. Li, C. Pan, J. Tang, G. Yu, *Building interfacial compatible PIM-1-based mixed-matrix membranes with B-ketamine-linked COF fillers for effective CO$_2$/N$_2$ separation, J Memb Sci* 676 (2023) 121561.

[g] X. Wu, Z. Tian, S. Wang, D. Peng, L. Yang, Y. Wu, Q. Xin, H. Wu, Z. Jiang, *Mixed matrix membranes including polymers of intrinsic microporosity and covalent organic framework for gas separation, J Memb Sci* 528 (2017) 273-283.

[h] X. Chang, H. Guo, Q. Chang, Z. Tian, Y. Zhang, D. Li, J. Wang, Y. Zhang, *Mixed-matrix membranes composed of dopamine modified covalent organic framework and PIM-1 for efficient CO$_2$/N$_2$ separation, J Memb Sci* 686 (2023) 122017

[i] Q. Chang. H. Guo, Z. Shang, C. Zhang, Y. Zhang, G. Dong, B. Shen, J. Wang, Y. Zhang, *PIM-based mixed matrix membranes containing covalent organic frameworks/ionic liquid composite materials for effective CO$_2$/N$_2$ separation, Sep Purif Technol* 330 (2024) 125518, each of [a]-[i] is incorporated herein by reference . . .

Knudsen flow, molecular sieving, and solution-diffusion processes are the three mechanisms most commonly utilized to describe the movement of gas molecules through membranes. However, due to the compact nature of the polymeric membrane, the solution-diffusion process is best suited to delineate the gas flow across the membrane. The solution-diffusion process is controlled by several parameters, such as free volume, intersegmental chain spacing (d-spacing), orientation, crosslinking, thermal stability, degree of crystallization, etc., which are affected by the presence of filler material.

The following factors can be well applied to describe and explain the selective separation of $CO_2$. The 2D COF-316 material is incorporated as it can enhance the FFV that is generated by disrupting the chain packing of the PEBAX-1657 polymer matrix, which increases $CO_2$ permeability. As shown in FIG. 1E and FIG. 1F, the 2D COF-316 has inherent nanopores that can enhance the gas transport and separation performance of the MMMs by creating extra channels and sieving effects. The $CO_2$ separation performance of PEBAX-1657 is mainly attributed to its PE chain segments, which interact preferentially with $CO_2$ molecules over nonpolar gas molecules. This interaction is further enhanced by the nitrile groups inside the pore of COF-316 nanosheets, which create favorable pathways for $CO_2$ molecules. The dipole-quadrupole interaction between —CN and $CO_2$ selectively creates a pathway for $CO_2$ to pass through the nanopore of the COF-316. This supports the argument for the selection of COF-316, a 2D filler material with six —CN groups present in every hexagonal pore, to enhance the selective separation of $CO_2$. The placement of the COF-316 2D-nanosheets in the polymer matrix causes them to align parallel to the membrane surface. This changes the diffusion paths and creates more resistance for the larger gas molecules, which could result in $CO_2/N_2$ selectivity enhancement.

Numerous modifications and variations of the present disclosure are possible in light of the above teachings. It is therefore to be understood that within the scope of the appended claims, the invention may be practiced otherwise than as specifically described herein.

The invention claimed is:

1. A method of separating a gas mixture, including:
  contacting the gas mixture with a membrane and passing a portion of the gas mixture through the membrane,
  wherein the portion of the gas mixture that passes through the membrane includes carbon dioxide,
  wherein the membrane includes:
    a poly(ether-block-amide) (PEBAX); and
    a covalent organic framework (COF),
  wherein the COF is an optionally substituted COF-316,
  wherein the COF is dispersed in a matrix of the PEBAX to form the membrane, and
  wherein the membrane includes 0.1-5 wt. % of the COF relative to a total weight of the membrane.

2. The method of claim 1, wherein particles of the COF are in a form of nanosheets having a length of 1-5 µm, a width of 1-5 µm, and a thickness of 10-50 nm.

3. The method of claim 2, wherein the nanosheets align parallel to a surface of the membrane in the matrix of the PEBAX.

4. The method of claim 1, wherein the COF has a BET surface area of 250-350 $m^2g^{-1}$.

5. The method of claim 1, wherein the COF is crystalline.

6. The method of claim 1, wherein the COF has a pore width of 12-15 Å.

7. The method of claim 1, wherein the COF is stable up to 400° C.

8. The method of claim 1, wherein the COF has the following structure:

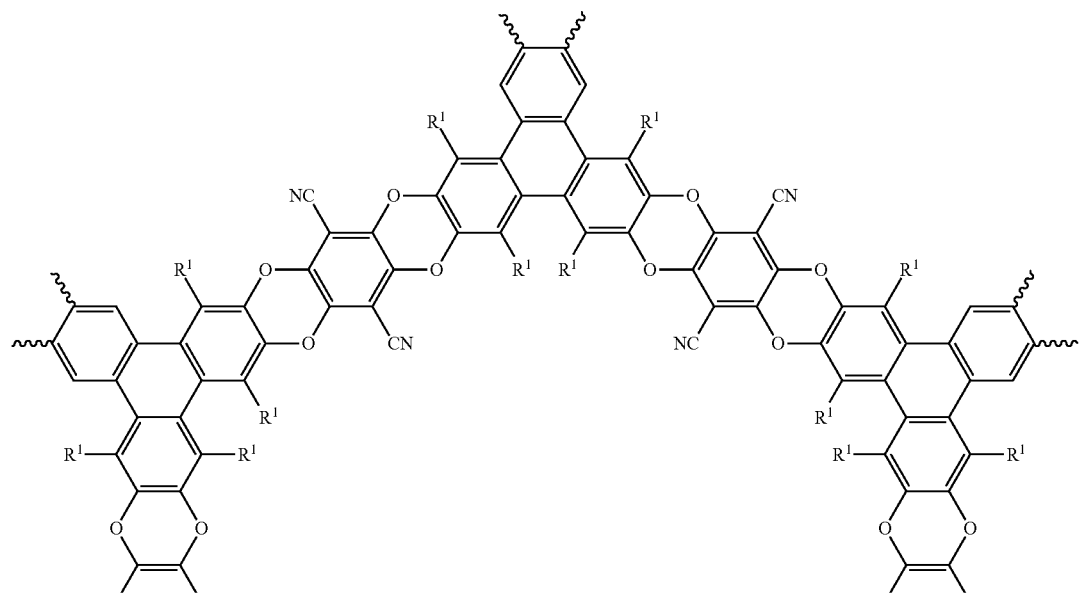

-continued

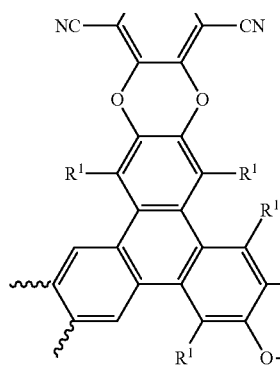 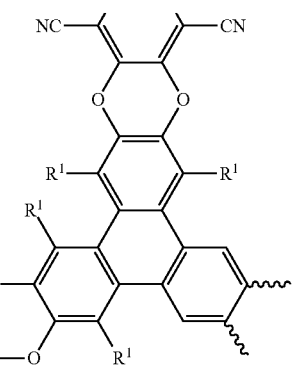

wherein $R^1$ is selected from the group consisting of a hydrogen, a hydroxyl, a carboxyl, an amine, a thiol, a nitrile, a cyanate, an isocyanate, and an amide, and wherein the squiggly lines represent bonding to additional units of the COF.

9. The method of claim 1, wherein the COF does not form aggregates in the membrane and is homogeneously dispersed.

10. The method of claim 1, wherein the PEBAX is PEBAX-1657.

11. The method of claim 1, wherein the passing the gas mixture is at a pressure of 1-5 bar.

12. The method of claim 1, wherein the PEBAX and the COF do not interact through covalent bonds.

13. The method of claim 1, wherein the membrane has a thickness of 20-200 μm.

14. The method of claim 1, wherein the membrane has a density of 1.00 to 1.15 g/cm³.

15. The method of claim 1, wherein the membrane has a free fractional volume of 14-22%.

16. The method of claim 1, wherein the gas mixture further includes at least one selected from the group consisting of nitrogen, oxygen, and argon.

17. The method of claim 1, wherein the membrane has a higher permeability for carbon dioxide than for other gases.

18. The method of claim 1, wherein the membrane has a $CO_2$ permeability 2-5 times larger than a membrane under the same conditions but without the COF.

19. The method of claim 1, wherein the membrane includes 0.5 wt. % of the COF relative to a total weight of the membrane, and
wherein the membrane has a $CO_2/N_2$ selectivity 2-5 times larger than a membrane under the same conditions but without the COF.

* * * * *